US012611952B2

(12) United States Patent
Dicke et al.

(10) Patent No.: US 12,611,952 B2
(45) Date of Patent: Apr. 28, 2026

(54) ELECTRIC TRUCK WITH AN ELECTRIC TAILGATE

(71) Applicant: EVJAM LLC, Minneapolis, MN (US)

(72) Inventors: Steven Dicke, St. Paul, MN (US);
Gregg Kromrey, Hudson, WI (US)

( * ) Notice: Subject to any disclaimer, the term of this patent is extended or adjusted under 35 U.S.C. 154(b) by 372 days.

(21) Appl. No.: 18/385,124

(22) Filed: Oct. 30, 2023

(65) Prior Publication Data

US 2024/0140337 A1     May 2, 2024

Related U.S. Application Data

(60) Provisional application No. 63/420,460, filed on Oct. 28, 2022, provisional application No. 63/420,428, filed on Oct. 28, 2022, provisional application No. 63/420,433, filed on Oct. 28, 2022, provisional application No. 63/420,447, filed on Oct. 28, 2022, provisional application No. 63/420,459, filed on Oct. 28, 2022, provisional application No. 63/420,445, filed on Oct. 28, 2022, provisional application No. 63/420,456, filed on Oct. 28, 2022, provisional application No. 63/420,419, filed on Oct. 28, 2022.

(51) Int. Cl.

| | |
|---|---|
| *B60L 53/00* | (2019.01) |
| *B60L 50/60* | (2019.01) |
| *B60L 50/64* | (2019.01) |
| *B60L 53/16* | (2019.01) |
| *B60L 53/22* | (2019.01) |
| *B60L 53/34* | (2019.01) |
| *B60L 53/51* | (2019.01) |
| *B60L 53/53* | (2019.01) |
| *B60R 16/04* | (2006.01) |
| *B62D 33/027* | (2006.01) |
| *H01M 10/46* | (2006.01) |
| *H02J 7/35* | (2006.01) |
| *B60S 1/66* | (2006.01) |
| *H02S 40/10* | (2014.01) |

(52) U.S. Cl.
CPC .............. *B60L 53/51* (2019.02); *B60L 50/64* (2019.02); *B60L 50/66* (2019.02); *B60L 53/16* (2019.02); *B60L 53/22* (2019.02); *B60L 53/34* (2019.02); *B60L 53/53* (2019.02); *B60R 16/04* (2013.01); *B62D 33/0273* (2013.01); *H01M 10/46* (2013.01); *H02J 7/35* (2013.01); *B60S 1/66* (2013.01); *H01M 2220/20* (2013.01); *H02S 40/10* (2014.12)

(58) Field of Classification Search
CPC .......... B60L 53/51; B60L 53/22; B60L 50/64; B60L 50/66; B60L 53/34; B60L 53/53; B60L 53/16; B60R 16/04; B62D 33/0273; H01M 10/46; H01M 2220/20; H02J 7/35; H02S 40/10; B60S 1/66
USPC .......................................................... 296/50
See application file for complete search history.

(56) References Cited

U.S. PATENT DOCUMENTS

| | | | | |
|---|---|---|---|---|
| 2019/0016231 A1* | 1/2019 | Scaringe | ............. | H01M 10/613 |
| 2019/0296295 A1* | 9/2019 | Ortmann | ............. | H01M 50/249 |
| 2019/0391577 A1* | 12/2019 | Uppalapati | ............... | B60L 3/12 |
| 2024/0051619 A1* | 2/2024 | Rutman | .................. | B60P 1/003 |

* cited by examiner

*Primary Examiner* — Steven O Douglas

(57) ABSTRACT

One or more examples provide an electric vehicle or a device for use with an electric vehicle, including an electric vehicle charging system and method. In one example, an electric truck with an electric tailgate is disclosed.

20 Claims, 20 Drawing Sheets

508

510

114

112

100

110

114

100

112

110

402

400

400

410

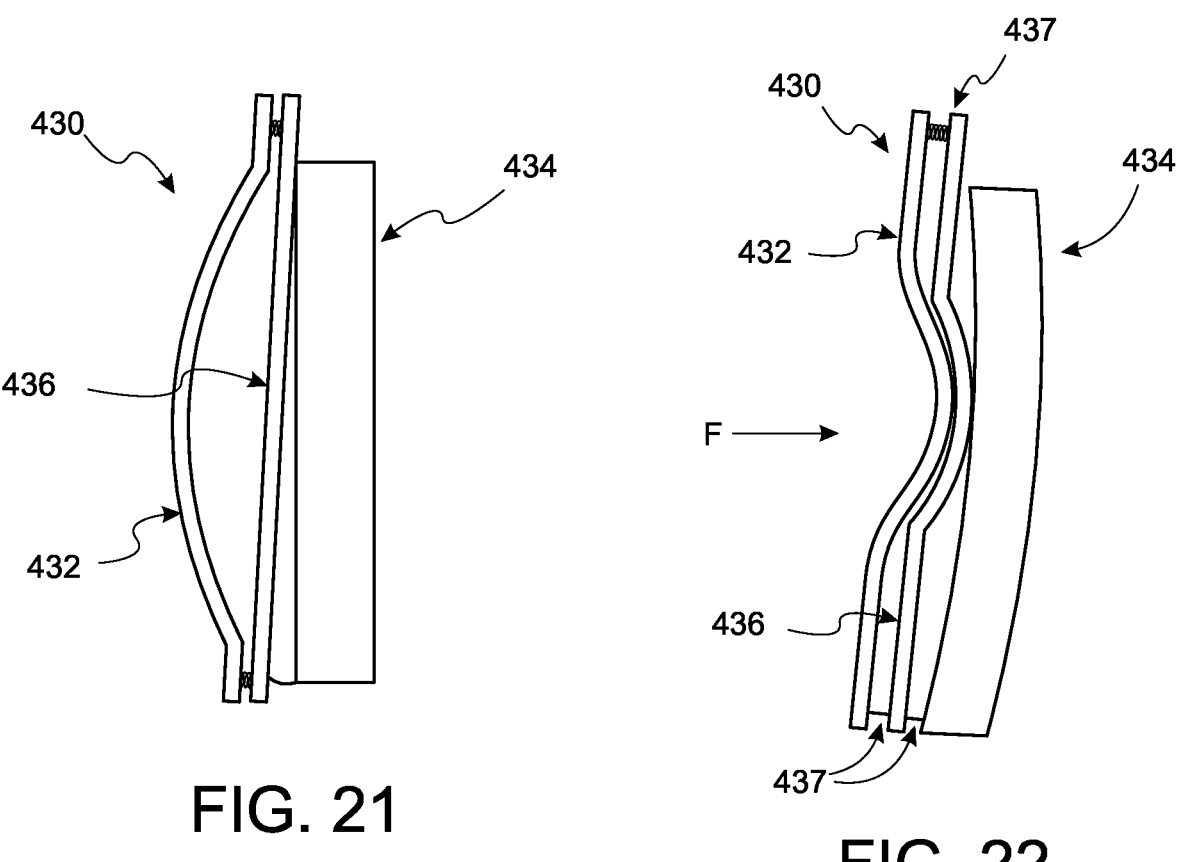
FIG. 21
FIG. 22
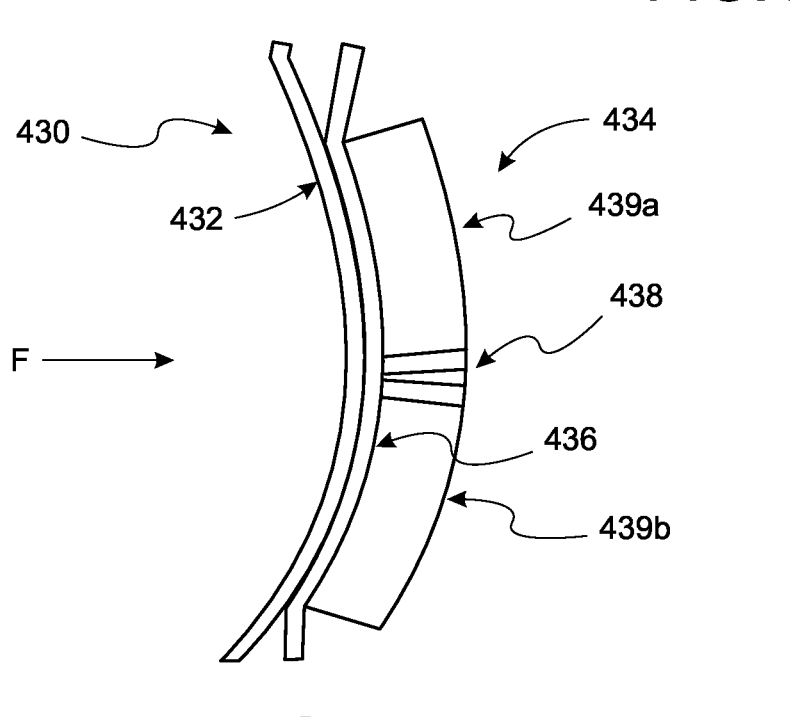
FIG. 23

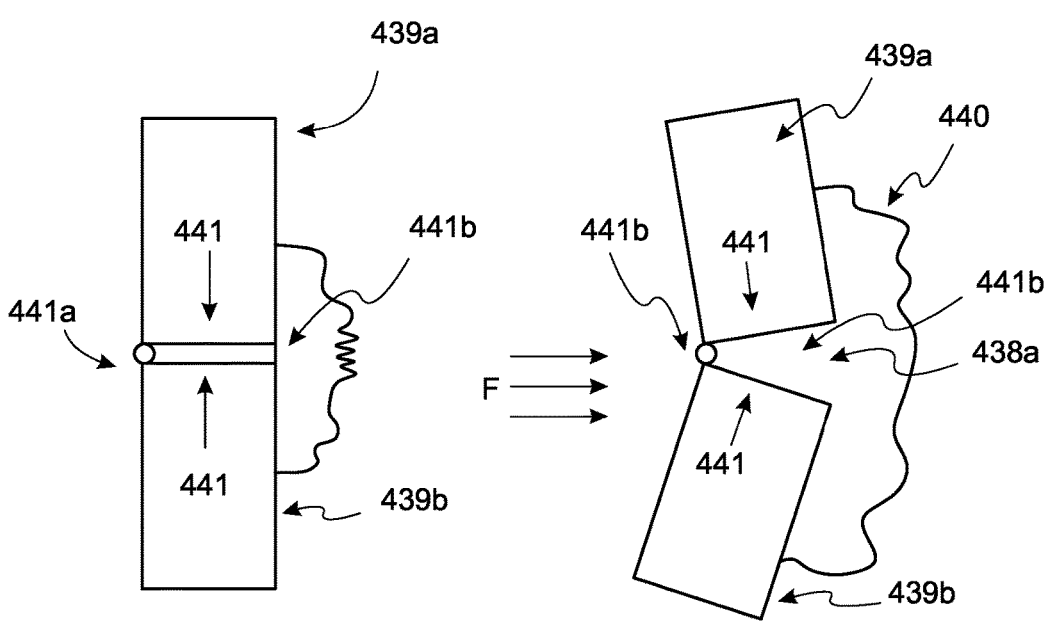
FIG. 26
FIG. 27
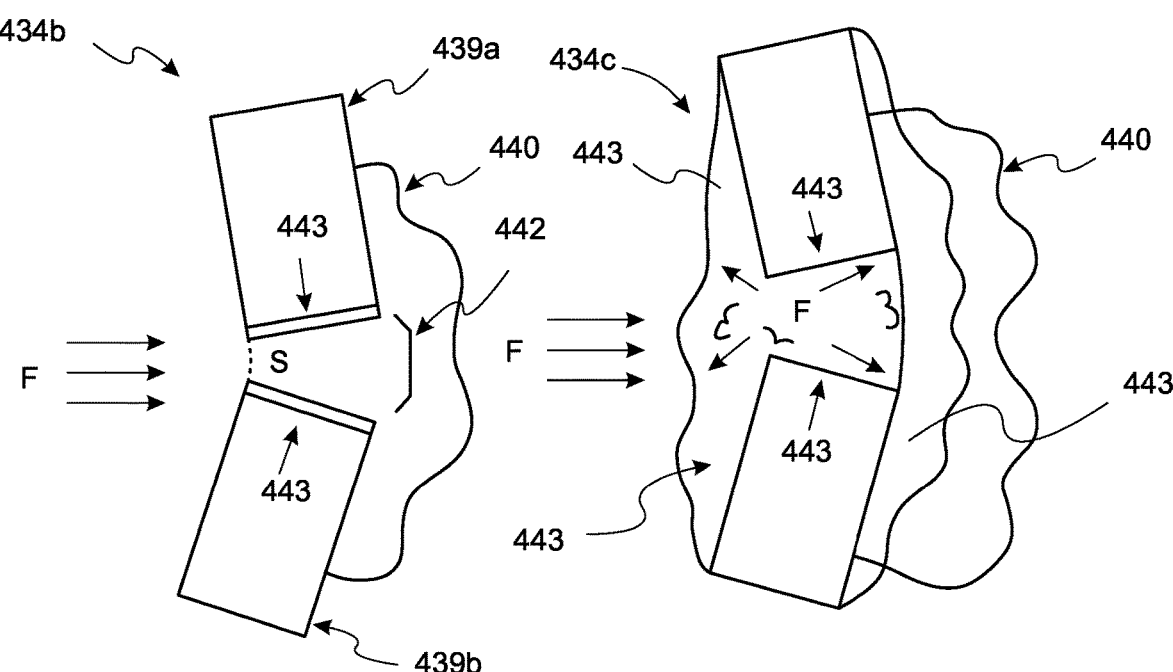
FIG. 28
FIG. 29

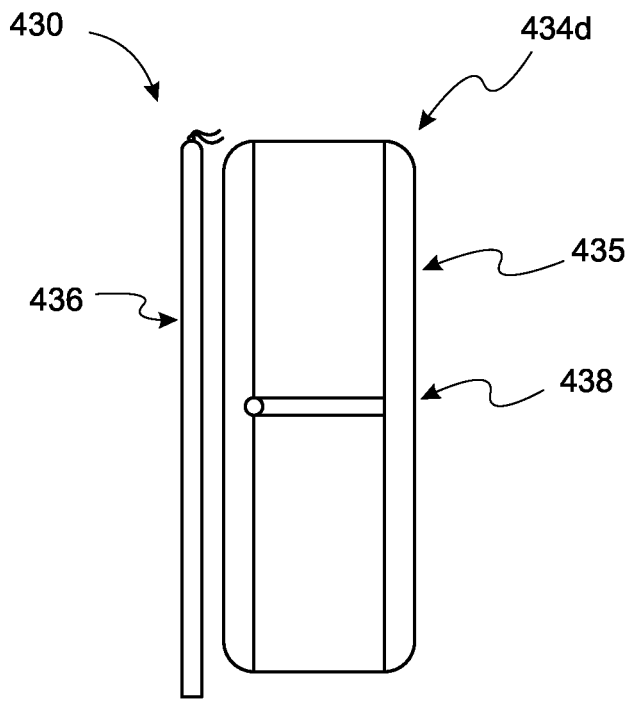
FIG. 30
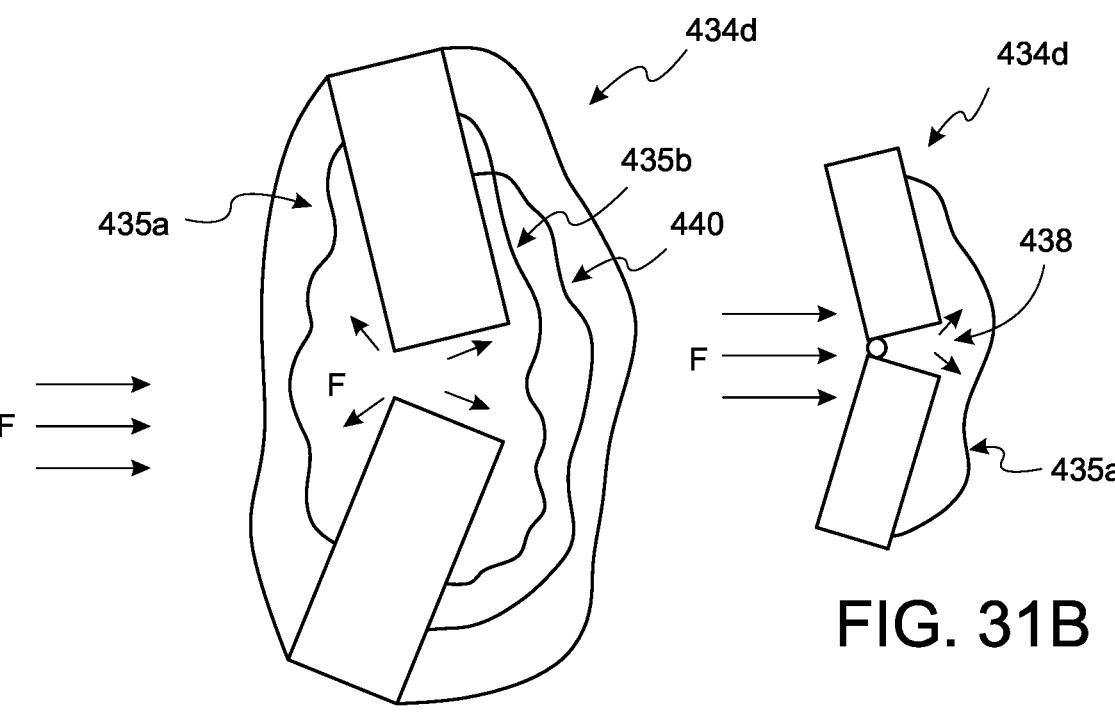
FIG. 31B
FIG. 31A

500

508

510

510

508

510

ELECTRIC TRUCK WITH AN ELECTRIC TAILGATE

CROSS REFERENCE TO RELATED APPLICATIONS

This Non-Provisional Patent Application claims the benefit of the filing date of U.S. Provisional Patent Application Ser. No. 63/420,419, filed Oct. 28, 2022, U.S. Provisional Patent Application Ser. No. 63/420,428, filed Oct. 28, 2022, U.S. Provisional Patent Application Ser. No. 63/420,433, filed Oct. 28, 2022, U.S. Provisional Patent Application Ser. No. 63/420,445, filed Oct. 28, 2022, U.S. Provisional Patent Application Ser. No. 63/420,447, filed Oct. 28, 2022, U.S. Provisional Patent Application Ser. No. 63/420,456, filed Oct. 28, 2022, U.S. Provisional Patent Application Ser. No. 63/420,459, filed Oct. 28, 2022, U.S. Provisional Patent Application Ser. No. 63/420,460, filed Oct. 28, 2022, all of which are herein incorporated by reference.

TECHNICAL FIELD

The present disclosure relates generally to examples of electric vehicles and to devices for use with an electric vehicle, including electric vehicle power systems, electric vehicle batteries and electric vehicle charging systems and devices.

BACKGROUND

Electric vehicles and electric vehicle devices provide quiet, clean, and efficient powertrains for moving from place to place or for getting work done.

For these and other reasons, there is a need for the present invention.

SUMMARY

The present disclosure provides one or more examples of an electric vehicle and systems and/or devices for use with an electric vehicle. In one or more examples, the system is an electric vehicle power system.

In one example, an electric tailgate is disclosed. The electric tailgate includes a tailgate housing and a tailgate power system. The tailgate power system is positioned within the tailgate housing, the tailgate power system comprising a tailgate battery pack, the tailgate battery pack including one or more panel batteries. A tailgate control unit coupled to the tailgate battery pack.

In one or more examples, the tailgate electric system can operate as a secondary power system, an extension of a primary power system, or as an emergency or backup power system.

Additional and/or alternative features and aspects of examples of the present technology will become apparent from the following description and the accompanying drawings.

BRIEF DESCRIPTION OF THE DRAWINGS

The Figures generally illustrate one or more examples of an electric vehicle and/or devices for use with an electric vehicle such as electric vehicle power systems, electric vehicle batteries or electric vehicle charging systems and devices.

FIG. 21 is a diagram illustrating one example of a battery pack system used in an electric vehicle.

FIG. 22 is a diagram illustrating one example of a battery pack system used in an electric vehicle.

FIG. 23 is a diagram illustrating one example of a battery pack system used in an electric vehicle.

FIG. 26 is a diagram illustrating one example of a battery pack system used in an electric vehicle.

FIG. 27 is a diagram illustrating one example of a battery pack system used in an electric vehicle.

FIG. 28 is a diagram illustrating one example of a battery pack system used in an electric vehicle.

FIG. 29 is a diagram illustrating one example of a battery pack system used in an electric vehicle.

FIG. 30 is a diagram illustrating one example of a battery pack system used in an electric vehicle.

FIG. 31A is a diagram illustrating one example of a battery pack system used in an electric vehicle.

FIG. 31B is a diagram illustrating one example of a battery pack system used in an electric vehicle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

Electric vehicles (EVs), such as automobiles (e.g., cars and trucks), autonomous vehicles, snowmobiles, electric watercraft, all-terrain vehicles (ATVs), side-by-side vehicles (SSVs), and electric bikes, for example, offer a quiet, clean, and more environmentally friendly option to gas-powered vehicles. Electric vehicles have electric powertrains which typically include a battery system, one or more electrical motors, each with a corresponding electronic power inverter (sometimes referred to as a motor controller), and various auxiliary systems (e.g., cooling systems).

One or more examples of the present application provide an electric vehicle. In one example, the electric vehicle includes an electric vehicle battery and other electric vehicle systems and devices. One or more features of electric vehicle systems and devices are described in further detail in the following paragraphs and illustrated in the Figures.

In one example, the present application discloses an electric vehicle having a primary power system and a secondary power system. The primary and secondary power systems can operate separately or used together as part of an electric vehicle power system.

Figure 1:
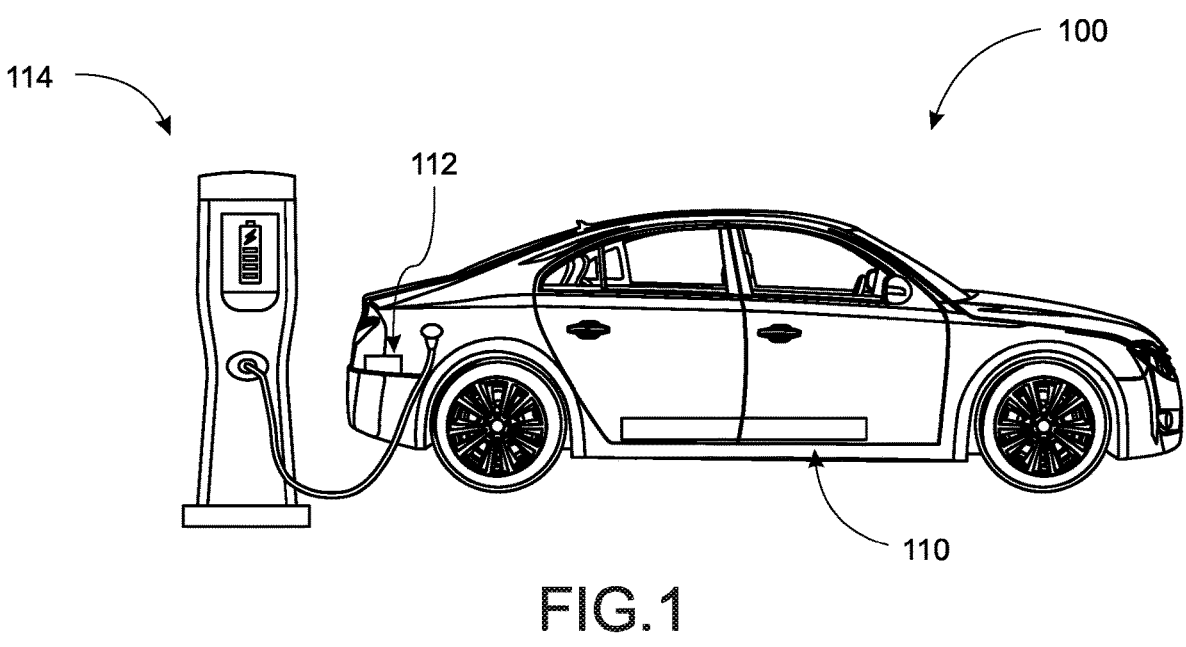
FIG. 1 illustrates one example of an electric vehicle, including an electric vehicle power system.
Figure 2:
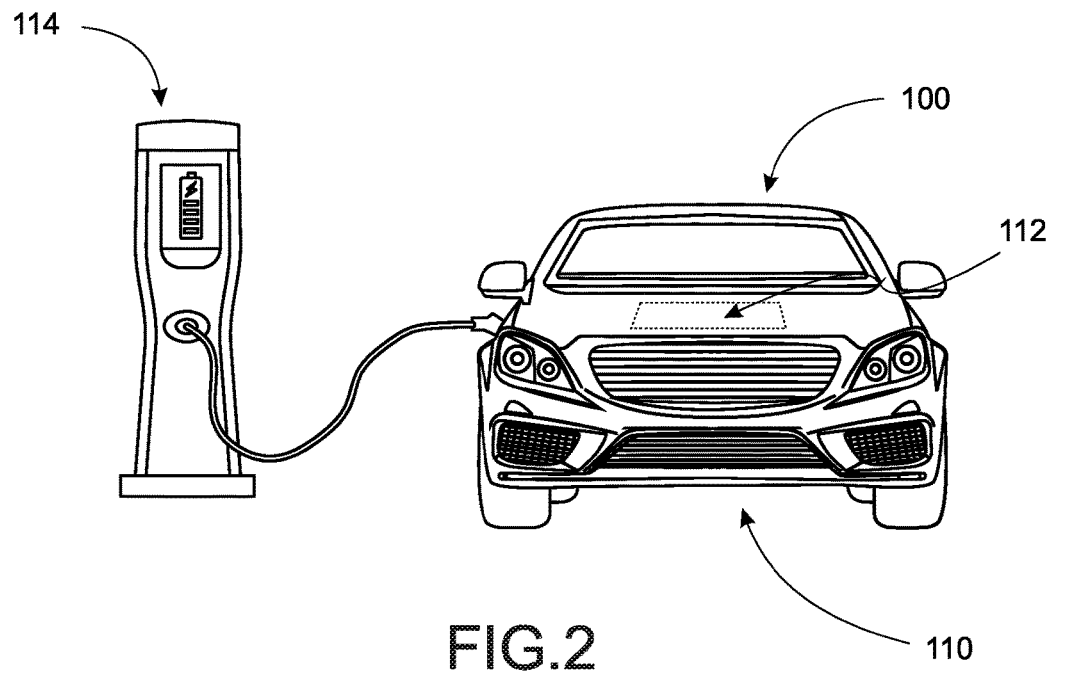
FIG. 2 illustrates one example of an electric vehicle, including an electric vehicle power system.

For example, the primary power system can be used as the main vehicle power source. The secondary power system can be used to power other devices. Additionally, the secondary power system can be used as a back-up power system to the primary power system. The primary power system may or may not be coupled to the same vehicle control unit. Primary and Secondary Power Systems FIGS. 1 and 2 generally illustrate one example of an electric vehicle 100 that includes a primary power system 110 and a secondary power system 112. The electric vehicle 100 is illustrated plugged into an electric vehicle charging station 114. The primary power system 110 and secondary power system 112 can be used together to power the electric vehicle 100, or can be used separately within the electric vehicle 100. For example, the primary power system 110 can be used as the main vehicle power source. The secondary power system 112 can be used to power other devices. Additionally, the secondary power system 112 can be used as a back-up power system to the primary power system 110.

The primary power system 110 may or may not be coupled to the same vehicle control unit as the secondary power system 112.

Figure 3:
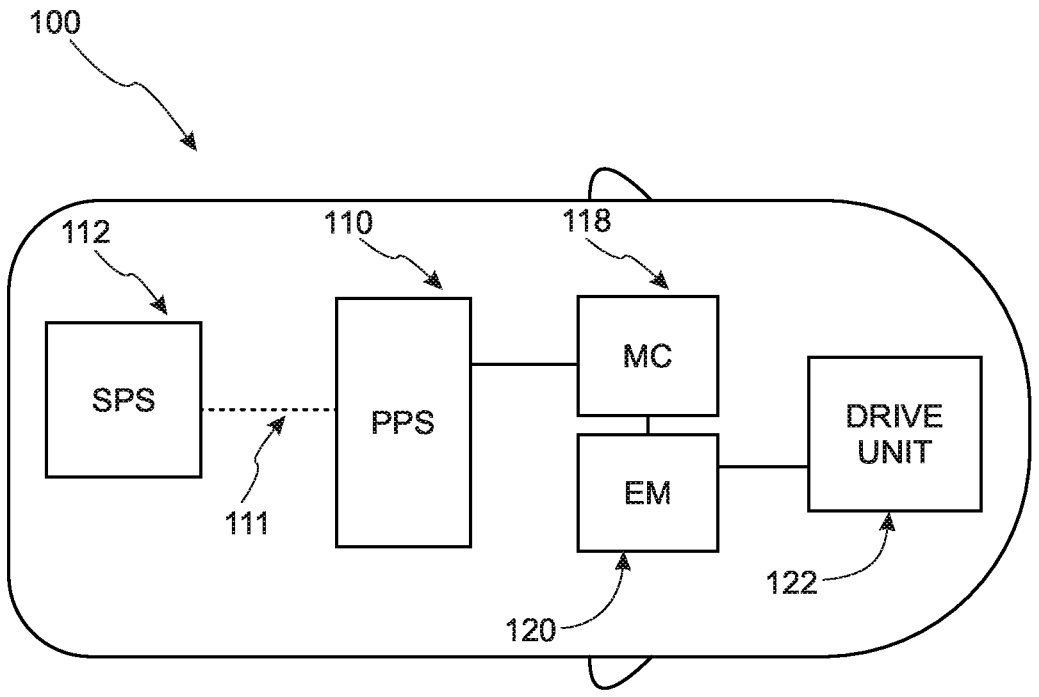
FIG. 3 is a block diagram illustrating one example of an electric vehicle with a secondary power system.

FIG. 3 is a block diagram generally illustrating one example of electric vehicle 100. The electric vehicle 100 includes the primary power system 110, a secondary power system 112, a motor controller 118, an electric motor 120, and a drive unit 122. The primary power system 110 operably powers the electric vehicle 100 via the motor controller 118, electric motor 120, and drive unit 122. The secondary power system 112 is located separate from the primary power system 110. The secondary power system 112 is used as a power source for other vehicle and non-vehicle devices. The secondary power system 112 is operably coupled to the primary power system 110, indicated at 111.

Figure 4:
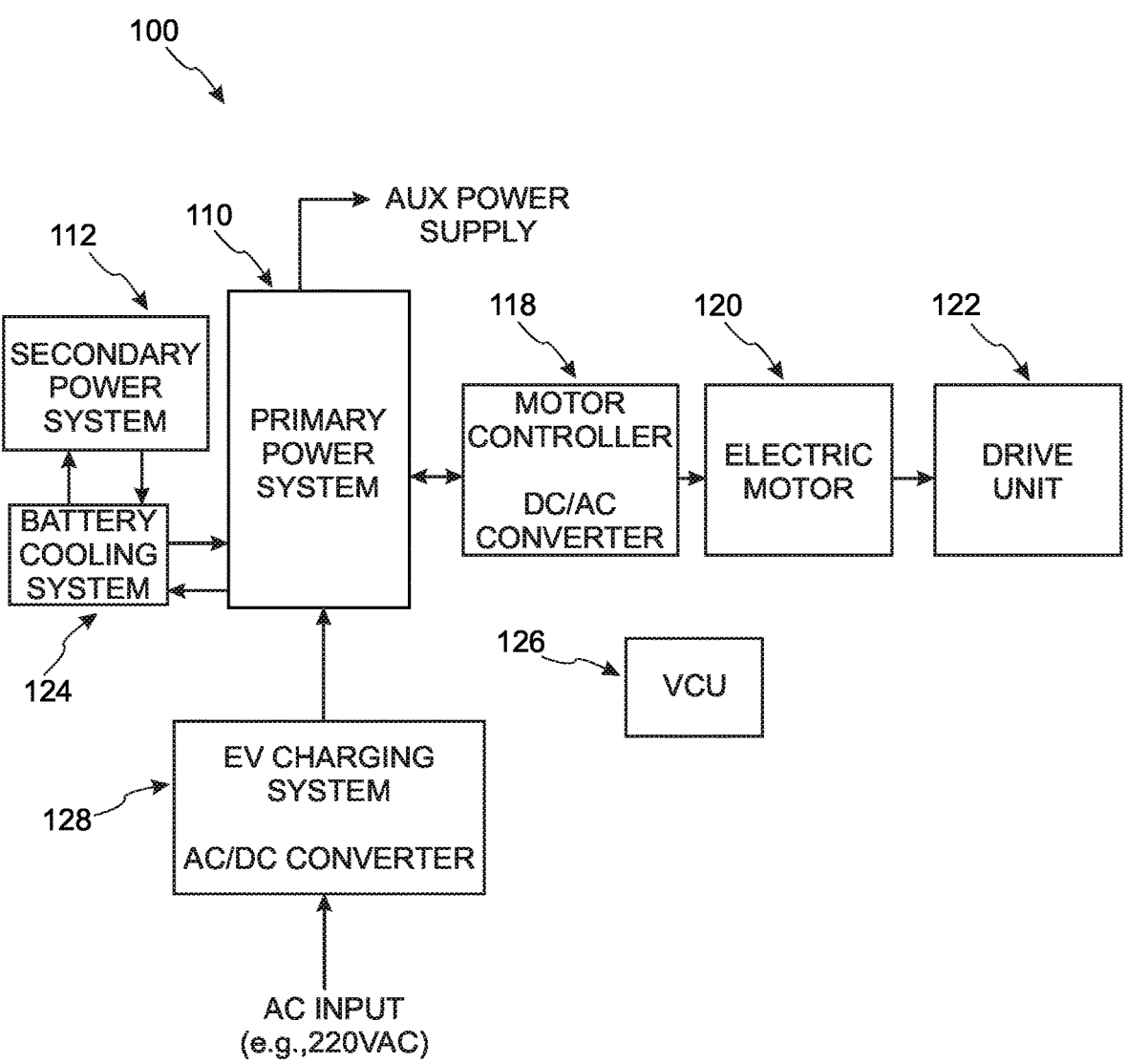
FIG. 4 is a block diagram illustrating one example of an electric vehicle with a secondary power system.

FIG. 4 is a detailed block diagram generally illustrating one example of electric vehicle 100. The electric vehicle 100 includes primary power system 110, secondary power system 112, motor controller 118, electric motor 120, and drive unit 122. Battery cooling system 124 operates to provide cooling to the primary power system 110 and secondary power system 112. A vehicle control unit (VCU) 126 coordinates operation of the electric vehicle 100 systems and devices.

The motor controller 118 includes a DC/AC converter, and converts the primary power output of the primary battery pack from a DC voltage to an AC operating voltage. The AC operating voltage is input to the electric motor 120, which in turn converts electrical energy to mechanical energy to power the drive unit 122 for operating the electric vehicle 100.

A vehicle charging system 128 operates to charge to primary power system 110 and the secondary power system 112. During a charging operation, the vehicle charging system 128 receives an AC supply voltage (e.g., 220 vac) from an external charging station (e.g., charging station 114). The vehicle charging system 128 converts the voltage to a DC voltage that feeds primary power system 110 and secondary power system 112. Alternatively, the electric vehicle charging system is a DC charging system, including a DC/DC converter (e.g., a DC fast charging system).

Figure 5:
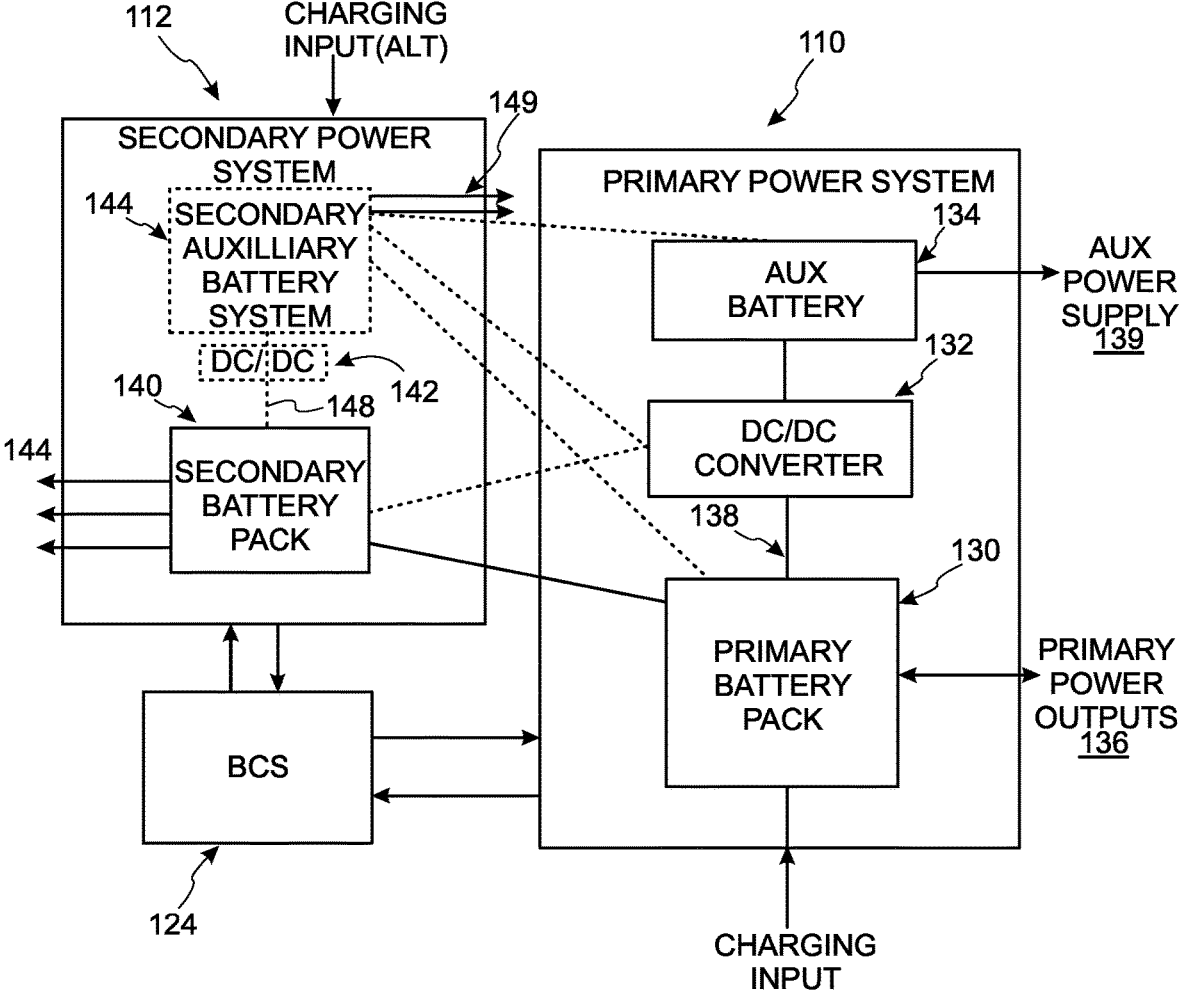
FIG. 5 is a block diagram illustrating one example of an electric vehicle with a secondary power system.

FIG. 5 is a detailed block diagram of one example of the electric vehicle primary power system 110 and the secondary power system 112. The primary power system 110 includes a primary battery pack 130, a DC/DC converter 132, and an auxiliary battery 134. In one example, the primary battery pack 130 is made of a bank of one or more batteries coupled together. The primary battery pack 130 provides a primary power output 136, including to the motor controller 118. The primary battery pack 130 provides a DC output for charging the auxiliary battery 134. In one example, The auxiliary battery 134 is a 13.5 volt battery. The DC/DC converter 132 steps down the supply voltage 138 received from the primary battery pack 130 (e.g., 600V DC) to the operating voltage of the auxiliary battery 134 (e.g., 13.5V DC). The auxiliary battery 134 provides auxiliary power outputs 139 to a variety of devices. These devices can include low voltage auxiliary devices. For example, the low voltage auxiliary devices may include dashboard lights, the vehicle steering system, vehicle seat heaters, vehicle lock system, or other electric vehicle auxiliary devices.

The secondary power system 112 includes a secondary battery pack 140, a DC/DC converter 142, and an auxiliary battery 144. In one example, the secondary battery pack 112 is made of a bank of one or more batteries coupled together and can be similar to the primary battery pack. The secondary battery pack 140 provides secondary power outputs 146. The secondary battery pack 140 provides a DC output for charging the secondary auxiliary battery 144. In one example, the secondary auxiliary battery 144 is a 13.5 volt battery. The DC/DC converter 142 steps down the supply voltage 148 received from the secondary battery pack 140 (e.g., 600V DC) to the operating voltage of the secondary auxiliary battery 144 (e.g., 13.5V DC). The secondary auxiliary battery 144 provides auxiliary power outputs 149 available to a variety of devices. These devices can include low voltage devices external to the electric vehicle.

In one alternative example, secondary battery pack 140 is a 13.5V DC battery pack. In this example, DC/DC converter 142 is not needed for stepping down the voltage.

A battery cooling system 124 is coupled to the primary power system 110 and secondary power system 112. In one example, the battery cooling system 124 includes a pump and coolant tank for pumping coolant through the primary battery pack 130 and secondary battery pack 140 to maintain optimum performance of the primary power system 110 and secondary power system 112. The battery cooling system 124 aids in operating the primary power system 110 and the secondary power system 112 at an optimal operating temperature.

In one example, the secondary battery pack 140 is charged through the primary power system 110. In another example, the secondary battery pack 140 is charged separate from the primary power system 110. The secondary battery pack 140 may be coupled to the battery cooling system 124 for battery cooling and maintaining the battery at an optimal operating temperature.

The secondary power system 112 may also include a secondary auxiliary battery system 144. Similar to the primary power system 110, the secondary auxiliary battery 144 may include a DC/DC converter 142 coupled to the secondary auxiliary battery 144. Alternatively, the secondary auxiliary battery 144 may be charged via the primary power system 110 DC/DC converter 132 or auxiliary battery 134.

The secondary power system 112 may include one or more of the following features.

The secondary power system 112 can be located completely separate from the primary power system 110. In one example, the primary power system 110 is generally located towards the front of the electric vehicle 100 with the primary battery pack 130 located below the seats of the electric vehicle 100. The secondary power system 112 is located towards the rear of the electric vehicle 100, such as in the trunk area of the electric vehicle 100. Alternatively, the secondary power system 112 can also be located near the front of the electric vehicle 100 (e.g., in the area under the hood).

The secondary power system 112 can be coupled to the primary power system 110 and provide emergency power to the electric vehicle 100 should the primary power system 110 be out of power or experience another type of power failure.

The secondary power system 112 can be charged via the same charging system as the primary power system 110 or may be separately charged. The secondary power system 112 may be used for powering devices separate from the primary power system 110, and/or devices external to the electric vehicle. The secondary power system 112 can be a bidirectional power system for powering external devices or providing power to an external power grid (e.g., emergency household power or camping power).

EV with Secondary Power System with Solar Charger

Figure 6:
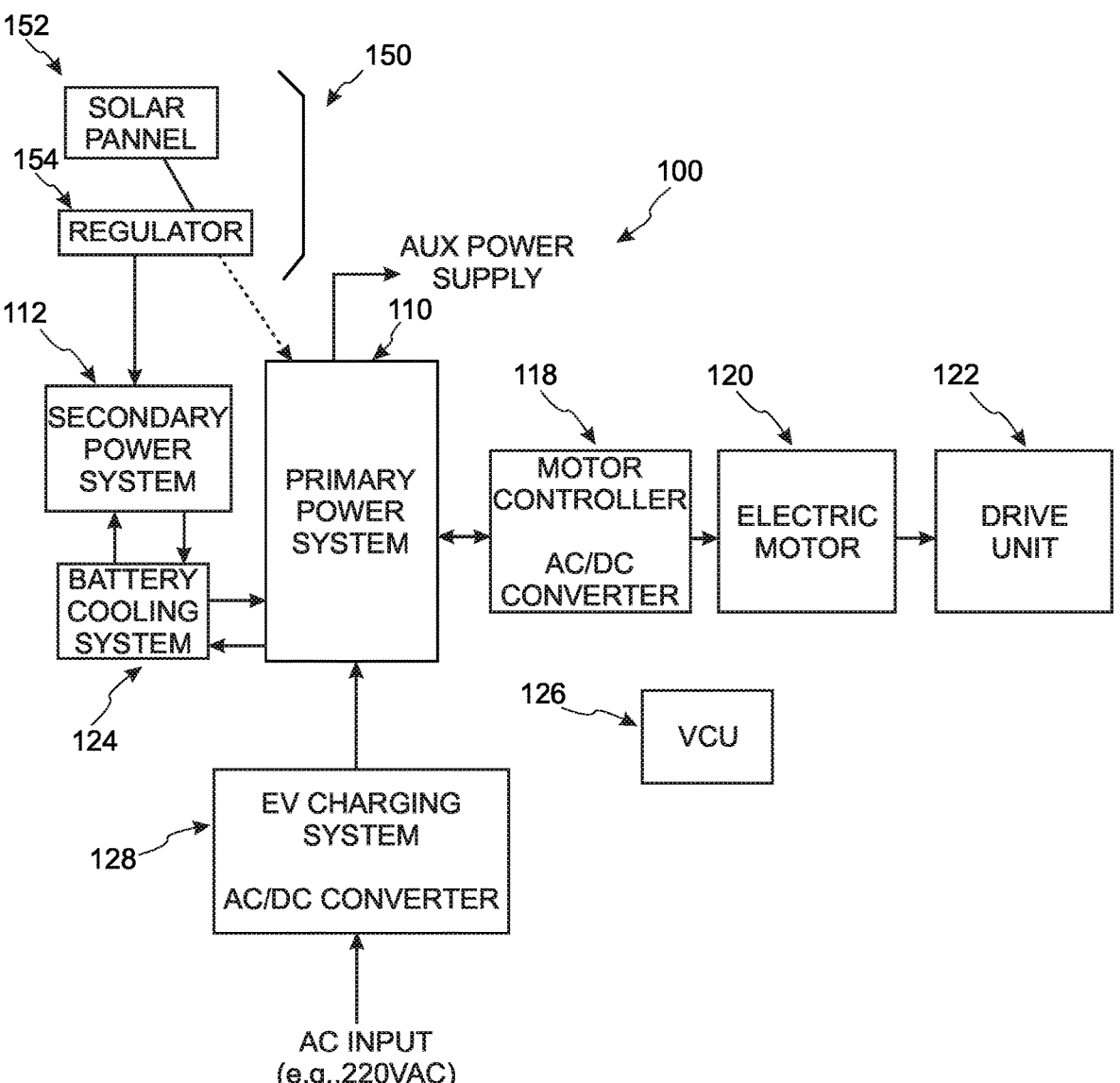
FIG. 6 is a block diagram illustrating one example of an electric vehicle with a secondary power system including a solar charging system.
Figure 7:
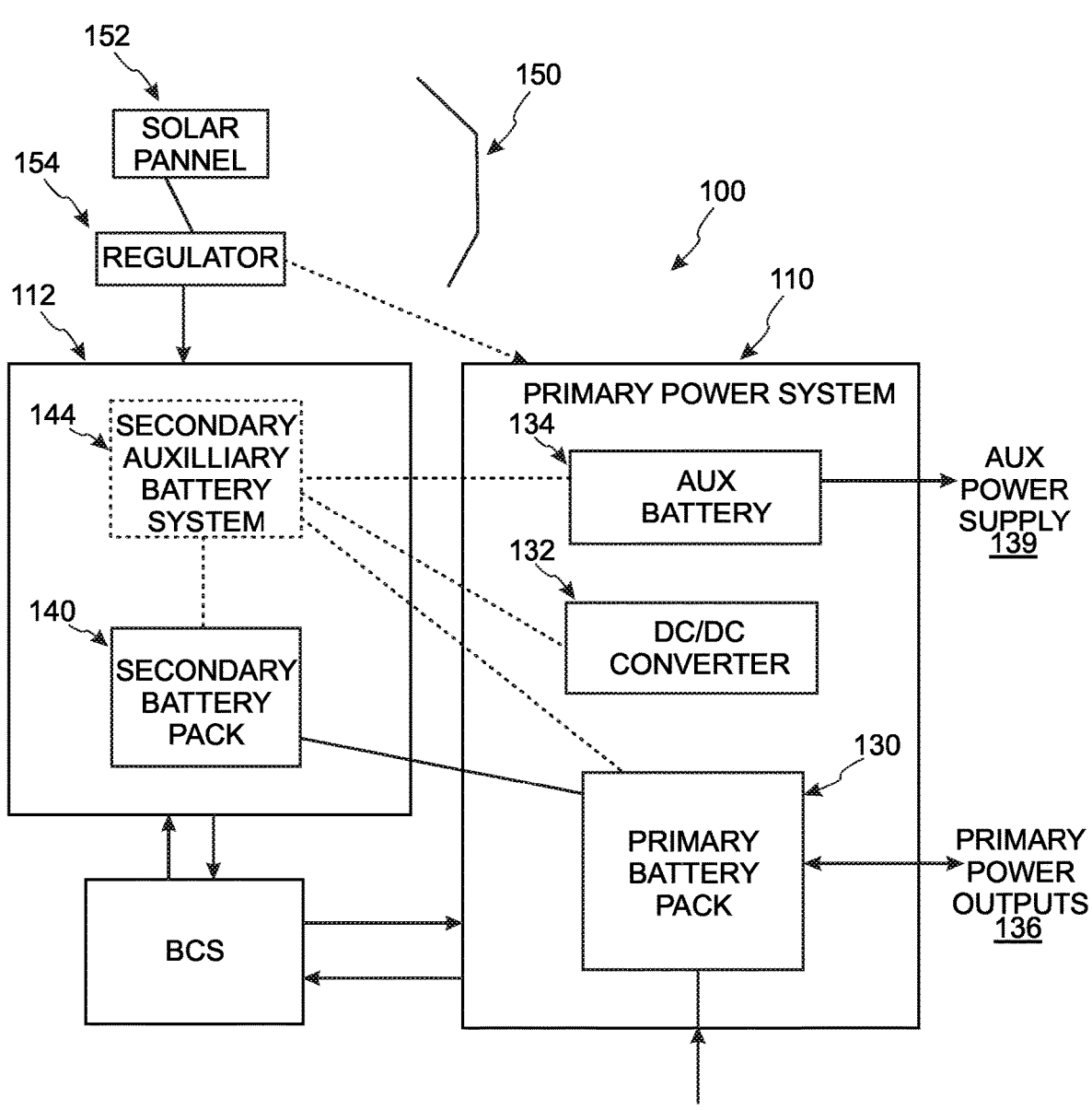
FIG. 7 is a block diagram illustrating one example of an electric vehicle with a secondary power system including a solar charging system.

FIG. 6 illustrates one example of electric vehicle 100. Electric vehicle 100 is similar to the electric vehicle 100 previously detailed herein. The electric vehicle 100 includes primary power system 110 and a secondary power system 112. A solar charging system 150 is used to charge the secondary power system 112. In reference also to FIG. 7, the solar charging system 150 includes a solar panel 152 that may be integrated into the electric vehicle 100. The solar charging system 150 may also include a regulator 154 either integrated into the solar panel 152 or located separate from the solar panel 152.

In one example, the electric vehicle 100 solar charging system 150 is used as an emergency charging system. The primary power system 110 includes a primary battery pack 130 that is charged during a normal charging operation using a charging port via ev charging system 128. The solar charging system 150 can be selectively used as a supplemental or primary charging system for the secondary power system 112, and as a backup or an emergency charging system for the primary power system when an external charger is not available. For example, when the electric vehicle is out on the road or in a conventional parking lot. In one example, when the solar charging system is used as an emergency charging system it is only used to charge the primary power system 110 auxiliary battery 134. Additionally, it is recognized that the solar charging system can be used while the vehicle is in operation.

Alternatively, the solar charging system can be solely used to charge the secondary power system 112. The secondary power system 112 can be used to power external or auxiliary devices and/or as a back-up or emergency power to the primary power system 110.

Hidden Solar Charging System. In one example, the solar charging system is a hidden solar charging system. The electric vehicle 100 includes a solar charging system 150. The solar charging system 150 is integrated into a vehicle exterior or external panel. The solar panel includes a transitional film layer that "hides" the solar panel from sight when viewed from the side. In one example, the transitional film is a directional film (e.g., a directional film layer). When viewed from a first location (for example, above the vehicle) the solar panel is viewable and operates to direct light to the solar cells of the solar panel. When viewed from a second location (for example, the side of the vehicle) the solar panel is not viewable due to the directional film. In one example, when viewed from the vehicle side the solar panel appears as a dark or black panel. Example solar panel locations include upward facing surfaces, such as a trunk surface, rooftop surface, hood or hatchback. In another example, the solar panel includes a light enhancement or light amplification layer. The amplification layer (e.g., a polymer magnification layer) operates to optimize the magnitude of light into the solar panel.

Figure 8A:
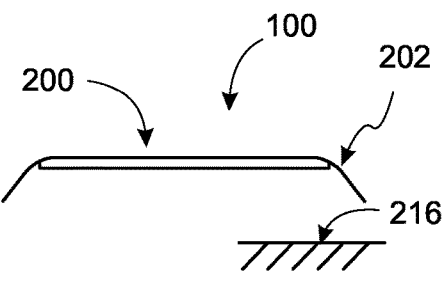
FIGS. 8A-8F illustrate one or more examples of an electric vehicle having a solar panel.

FIG. 8A illustrates generally at 200 one example of a solar charging system that is a hidden solar charging system. The hidden solar charging system 200 is integrated into a vehicle exterior panel 202. In one example, the hidden charging system 200 is located on a vehicle roof, trunk surface, or hood surface. FIG. 8B illustrates one detailed example of hidden solar charging system 200. The hidden solar charging system 200 includes a solar panel 204 having an array of solar cells 206. In one or more examples, the solar cells are silicon solar cells (e.g., monocrystalline, polycrystalline, amorphous, etc.), thin film, photovoltaic, or other suitable type of solar cell. The solar panel 204 includes a directional film layer 210 (e.g., a directional film as made by 3M Company). The directional film layer 210 operates to direct light into the solar panel 204 solar cells 206, while hiding the solar panel from plain view. In one example illustrated, when viewed from a first location (e.g., above the solar panel) as illustrated by eye 212, the solar panel 204 is entirely viewable and light is directed at the solar panel 204 solar cells 206. When viewed from a second location (e.g., a side location) as illustrated by eye 214, the solar panel 204 solar cells 206 are not viewable. The solar cells 206 are hidden from view due to the presence of directional film layer 210. In one example, when viewed from second location 214 the hidden solar charging system 200 merely appears as a dark surface or black surface (e.g., looks like a black roof, hood or trunk). In this example, the hidden solar panel is in a generally horizontal position relative to flat ground 216.

Figure 8D:
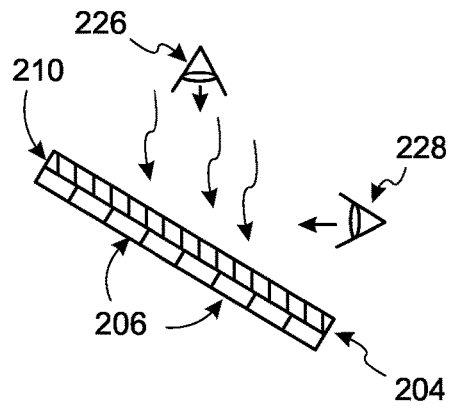
Figure 8B:
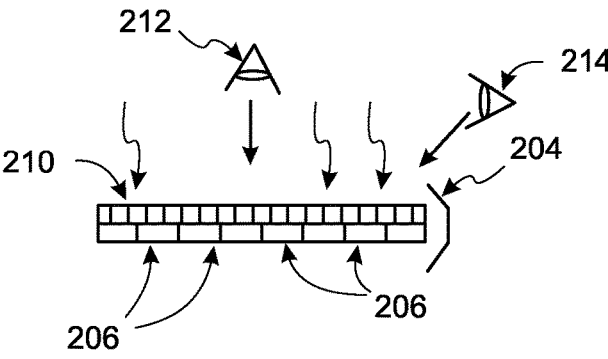
Figure 8E:
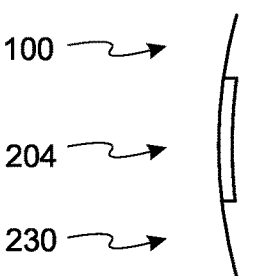
Figure 8C:
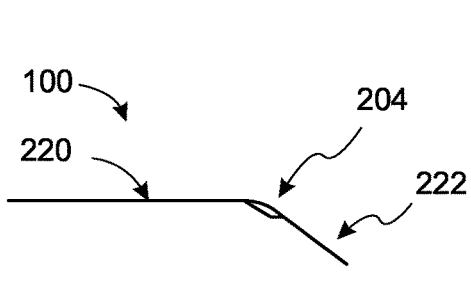

FIGS. 8C and 8D illustrate one example of hidden solar panel 204 being located on an angled surface of vehicle 100. In one example, the hidden solar panel 204 is located at an interface between a generally horizontal roof 220 and a front window, rear window or hatchback angled surface 222. The directional film layer is not aligned outward relative to solar panel 204. Instead, the directional film layer 210 is aligned, oriented or directed straight upward (again, generally orthogonal to a horizontal ground plane) to maximize and direct the light from above into the solar panel 204. As such, when viewed from first location 226 the solar panel cells are viewable, and when viewed from second location 228 the solar panel cells are hidden and the solar panel 204 appears as a black, dark or other colored surface. Alternatively, the directional film 210 could be oriented to direct light into the solar panel 204 from a location orthogonal to the solar panel surface.

Figure 8F:
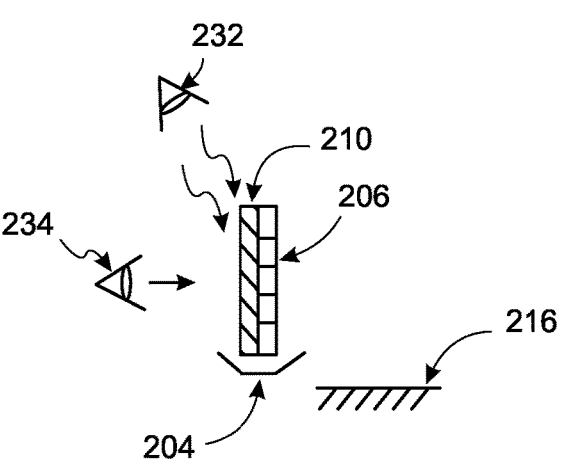

FIGS. 8E and 8F illustrate one example of an electric vehicle with an exterior solar side panel. The electric vehicle includes a solar panel 204 integrated into a vehicle 100 side panel 230. For example, it may be desirable to have a solar charging panel that is a side panel located in close proximity to a device needing to be charged, such as the vehicle battery, or for charging a specific device with its own separate battery such as an automated door lock/unlock or vehicle lights. The solar panel 204 may include a directional film 210 for optimizing the directing of light to the solar panel 204 solar cells 206. In this example, the solar panel is oriented generally vertically relative to a horizontal ground plane 216. Although the solar panel 204 is generally vertical, including the directional film layer 210, the directional film itself is configured to direct light to the solar cells 206 from above the vehicle. As such, when viewed from a first location 232 (generally above the vehicle) the solar cells are viewable and light from above (e.g., the sky) is directed into the solar cells. When viewed from a second location 234 (e.g., a side of the vehicle), the solar panel simply appears as a dark, black, or otherwise colored surface to a viewer.

Figure 9:
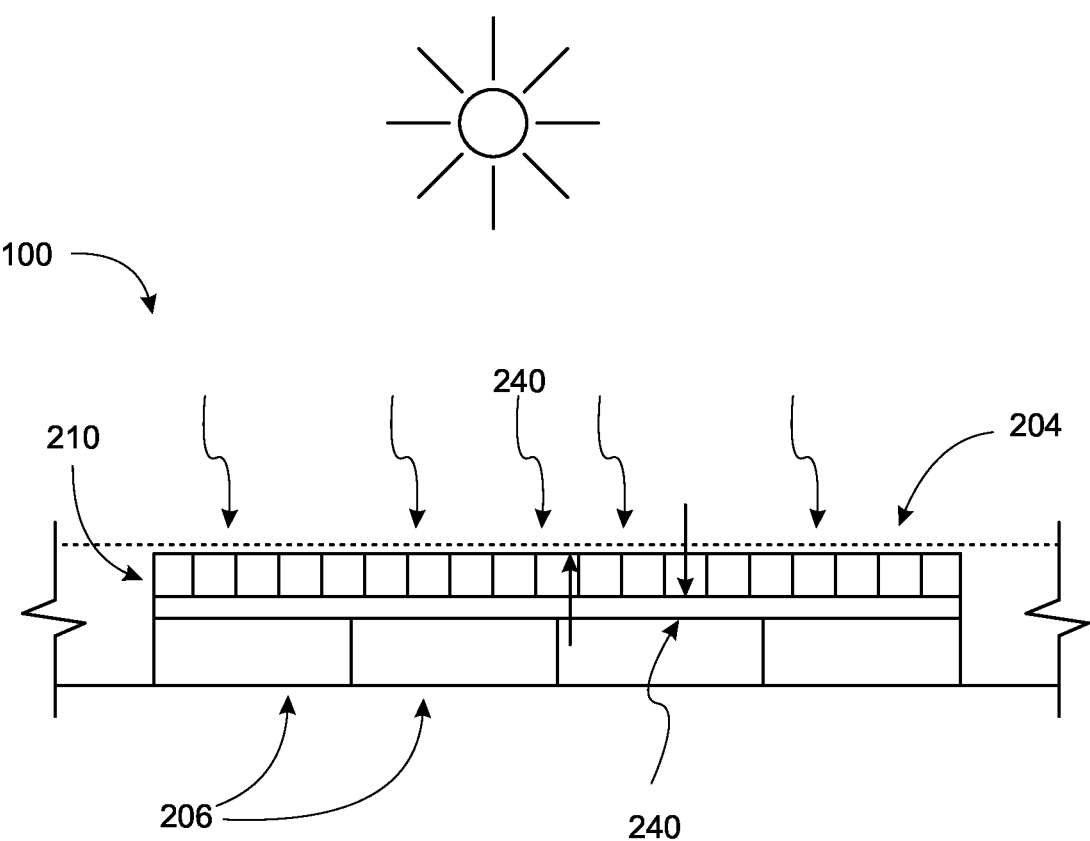
FIG. 9 illustrates one example of a solar panel integrated into an electric vehicle.

FIG. 9 illustrates another example solar panel for use with an electric vehicle. In one example, the solar panel 204 is integrated into an exterior surface of electric vehicle 100. The solar panel includes an amplification layer to optimize the amount of light directed at solar panel 204. In one example illustrated, solar panel 204 includes solar cells 206. An amplification layer 240 is positioned above solar cells 206. In one example, amplification layer 240 is positioned on solar cells 206. Directional film 210 is positioned over solar cells 206. In one example, amplification layer 230 is positioned between solar cells 206 and directional film 210. In another example, amplification layer 240 is positioned above directional film 210 (i.e., directional film 210 is located between amplification layer 210 and solar cells 206). The amplification layer can cover the entire major surface of the solar panel 204, or partially or selectively cover portions of the major surface of solar panel 204. In another example, an amplification layer is located on each side of the directional film layer. Amplification layer 240 optimizes the amount of light directed at solar panel 204, and is made of one or more materials exhibiting light amplification characteristics (e.g., a light amplification thin film, thin film polymer layer, glass, or other amplification or magnification material) that directs, magnifies, and/or amplifies light.

Solar Charging System with a Solar Panel Cleaning System. In one example, the solar charging system includes a solar panel cleaning system. The solar panel cleaning system aids in optimizing light input to the solar panel. One or more examples of an electric vehicle including a solar panel charging system with a solar panel cleaning system is detailed in the following paragraphs.

Figure 10A:
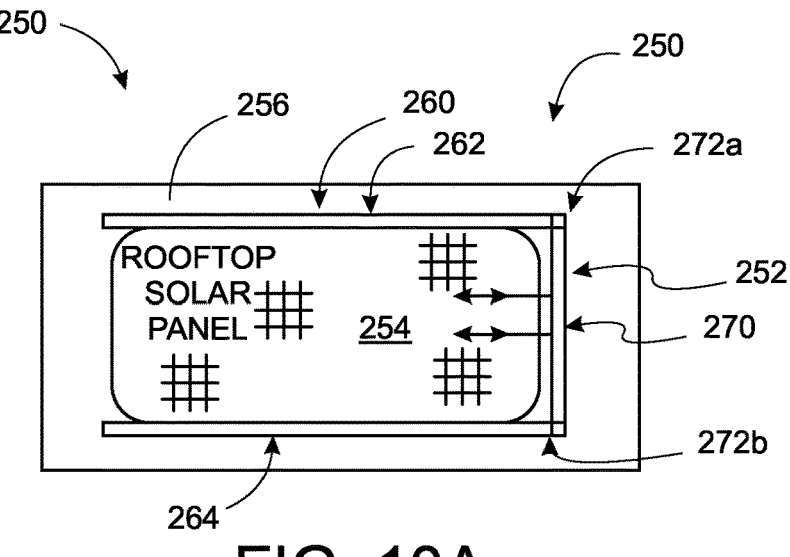
FIGS. 10A-10D illustrate one or more examples of a vehicle having a solar panel.
Figure 10B:
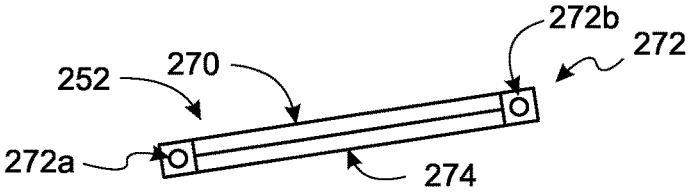
Figure 10C:
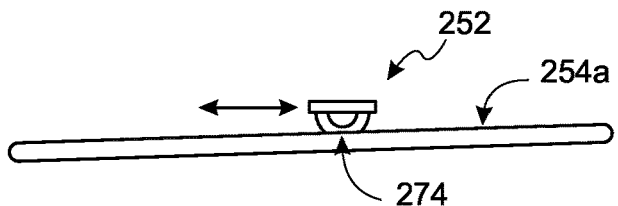

FIGS. 10A-10D illustrate an electric vehicle 250 having a solar charging system 250, including a solar panel cleaner 252. As illustrated in FIG. 10A, the electric vehicle 250 has a solar panel 254 integrated into its roof 256. A solar panel cleaner 252 is operably coupled to the electric vehicle 250. In one example, the electric vehicle includes solar panel 254 on its roof 256. The electric vehicle has a rooftop side rail system 260. Solar panel cleaner 252 is operably coupled to the side rail system 260. In one example, the solar panel cleaner 252 rides on side rail system 260, cleaning the solar panel 254 as it moves along the rail system 260 and across solar panel 254.

In one example, the rail system 260 including rails 262,264. Each rail is coupled to a side of the roof 256. The solar panel cleaner 252 includes a cleaning rail 270, a roller system 272, and a cleaning member 274. Roller system 272 is movably coupled to rail system 260. In one example, roller system 272 is coupled to rail system 260 at rail 262 and rail 264. Cleaning rail 270 extends between rails 262, 264 at roller 272a and roller 272b. Cleaning member 274 is positioned on cleaning rail 270 facing the solar panel 254. In one example, cleaning member 274 is tensioned against a major surface 254a of solar panel 254 that will be cleaned.

Cleaning member 274 is made of a cleaning material that removes material located on the solar panel as it moves across the surface of the solar panel, optimizing the efficiency of the solar panel charging system. In one example, the solar panel cleaning member 274 is made of or has an outer layer that is made of a microfiber cleaning material. In one example, the cleaning member is made of a suede material. In one example, the cleaning member includes a brush-like surface that interacts with the solar panel to clean the surface.

Roller system 272 can be manually operated or automatically operated to clean the solar panel 254. In one example, solar panel cleaner 252 is automatically operated. Roller system 272 is a motorized roller system that operates along rail system 260. In one example, only one roller, such as roller 272a, is motorized and automatically controlled. Roller 272b freely rolls on an opposite rail. In another example, both roller 272a and roller 272b are motorized.

Figure 10D:
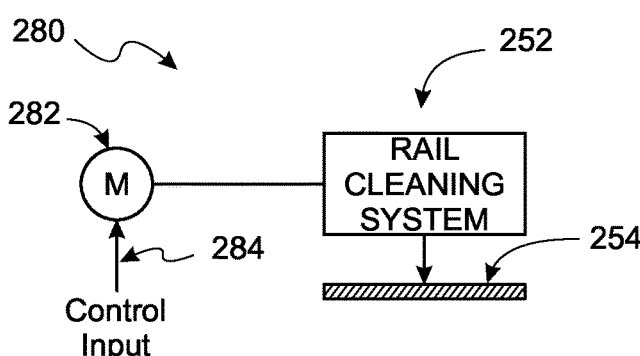

FIG. 10D is a block diagram 280 of the solar panel cleaner 252 cleaning system. The cleaning system 280 includes motor 282. The motor 282 receives a control input 284 for moving solar panel cleaner 252 across the surface of solar panel 254. In one example, the cleaning system 280 is operated by pushing a button, via an electric vehicle graphical user interface (GUI) or via an application that is located on a device such as a computer, tablet or phone. The solar panel cleaner can be set to clean the solar panel at preset times. Alternatively the solar panel cleaner can be set to clean the solar panel based on vehicle actions, such as starting or turning off the vehicle or every time a driver's door is opened and/or shut, everytime the vehicle is locked, or other regular activation.

The solar panel cleaner 252 moves relative to solar panel 254, and in particular relative to solar panel major surface 254*a*. In one example, the solar panel cleaner 252 moves across major surface 254*a* that is stationary. In one example, during a solar panel cleaning operation, solar panel cleaner 252 moves across the solar panel 254 cleaning material from a first major surface 254*a* of the solar panel. After a cleaning operation, the solar panel cleaner 252 reverses directional and returns to a docking location at the front or back of the vehicle. The solar pane cleaner 252 may perform a second cleaning operation as it returns to its docked or starting position.

Figure 11:
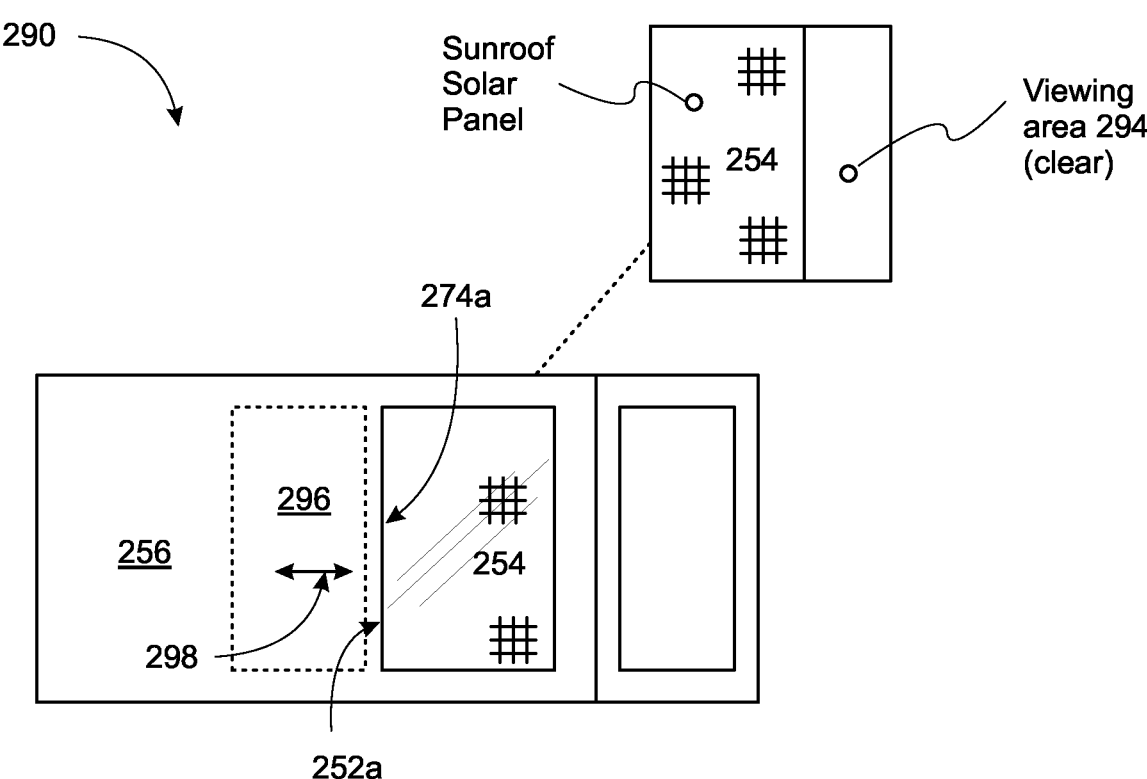
FIG. 11 illustrates one or more examples of a vehicle having a solar panel.
Figure 12:
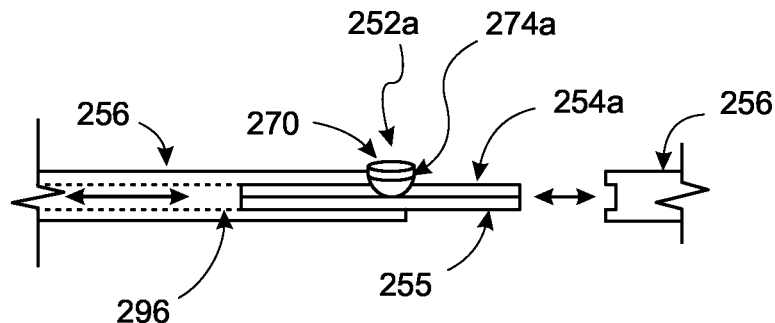
FIG. 12 illustrates one example of a vehicle including a solar panel.

FIGS. 11 and 12 illustrate another example of an electric vehicle including a solar charging system with a solar panel cleaner. Electric vehicle 290 includes a sunroof 292. In one example, the sunroof 292 is a motorized sunroof. A solar panel 254 is integrated with the sunroof 292. In one example, a solar panel 254 is located on top of the sunroof 292. In operation, a user can open the sunroof 292 letting fresh air into the electric vehicle 290. When the sunroof 292 is closed, the sunroof solar panel 254 operates as a solar charging system for the electric vehicle power system as previously described herein (e.g., a primary power system, secondary power system, or auxiliary power system). In one example, when the sunroof is closed, the sunroof includes both a sunroof solar panel 254 and a viewing area 294. In the open position, the sunroof solar panel is hidden from view having moved into roof or sunroof pocket 296.

The electric vehicle 290 may further include a solar panel cleaner 252*a*, which can be similar to the solar panel cleaner 252 previously described herein. The solar panel cleaner 252*a* includes a cleaning rail 270*a* cleaning member 274*a*. Cleaning rail 270*a* extends across an edge of the solar panel 254. In one example, the cleaning rail 270*a* is positioned at a location where the solar panel 254 enters a pocket 296 in the vehicle roof when moving between an open position and a closed position. Cleaning member 274*a* is positioned on cleaning rail 270*a* facing a major surface 254*a* of the solar panel 254. In one example, cleaning member 274*a* is tensioned, pressed or pressured against major surface 254*a* of solar panel 254 that will be cleaned. In operation, every time the sunroof solar panel 254 is moved between an open position and a closed position as illustrated by arrow 298, the major surface 254*a* of solar panel 254 is cleaned by cleaning member 274.

Cleaning member 274*a* is made of a cleaning material that removes material located on the solar panel 254 as it moves across cleaning member 274. In this application, the cleaning member 274*a* is moved relative to the surface of the solar panel. In this example, the solar panel 254 moves and the cleaning member 274*a* is stationary relative to the electric vehicle 290. By cleaning the solar panel 254 (i.e., cleaning major surface 254*a*) every time the sunroof is moved between an open position and a closed position, it aids in optimizing the efficiency of the solar panel charging system by optimizing the amount of light that enters the solar panel. In one example, the solar panel cleaning member 274*a* is made of or includes an outer layer of a microfiber cleaning material. In another example, the cleaning member is made of a suede material or includes a layer of suede material that interacts with major surface 254. In one example, the cleaning member includes a brush-like surface that interacts with the solar panel to clean the surface.

In one example, when in a closed position, the sunroof includes both a solar panel and a viewing area/viewing window 294. The sunroof solar panel can be an add-on device to an existing vehicle sunroof system and is not limited to use in electric vehicles.

One or More Examples of Use of a Primary and/or Secondary Power System is Detailed in the Following Paragraphs.

Electric Vehicle with Secondary Power Supply for Aux Systems (e.g., Light Kit). The electric vehicle includes a primary power supply and a secondary power supply. The primary power supply is used to power the vehicle primary systems. The secondary power supply is used to power auxiliary systems such as an EV light kit. In one or more examples, the light kit may include lights added to the external surfaces of the vehicle or the lights may be integrated into vehicle pieces or panels. In one example, the lights are located along the bottom of the vehicle. The auxiliary system can "quick connect" to the secondary power supply.

Electric Vehicle with Auxiliary Powered Defrost System

EV includes secondary power supply (battery) used to power auto defrost. The battery is charged via a vehicle mounted solar panel that may be integral with a vehicle panel. The battery also could be charged via a secondary power charging port. One or more example features include: Passive operation not limited to the vehicle running; a temperature and/or moisture sensor that may be located on or off of the window; a control system for sequencing the defrost on or off based on temperature and/or moisture.

Electric Vehicle with Cold Weather Battery Warming System. The EV includes a secondary power supply (battery) used to heat a battery during cold weather. This is important because batteries that are too cold do not have the same power output as batteries that operate at optimal battery temperature. A solar panel or separate charging unit is used to charge the secondary power supply so as not to drain the EV primary power system battery. The battery warming system can operate to condition the battery prior to use.

Figure 13:
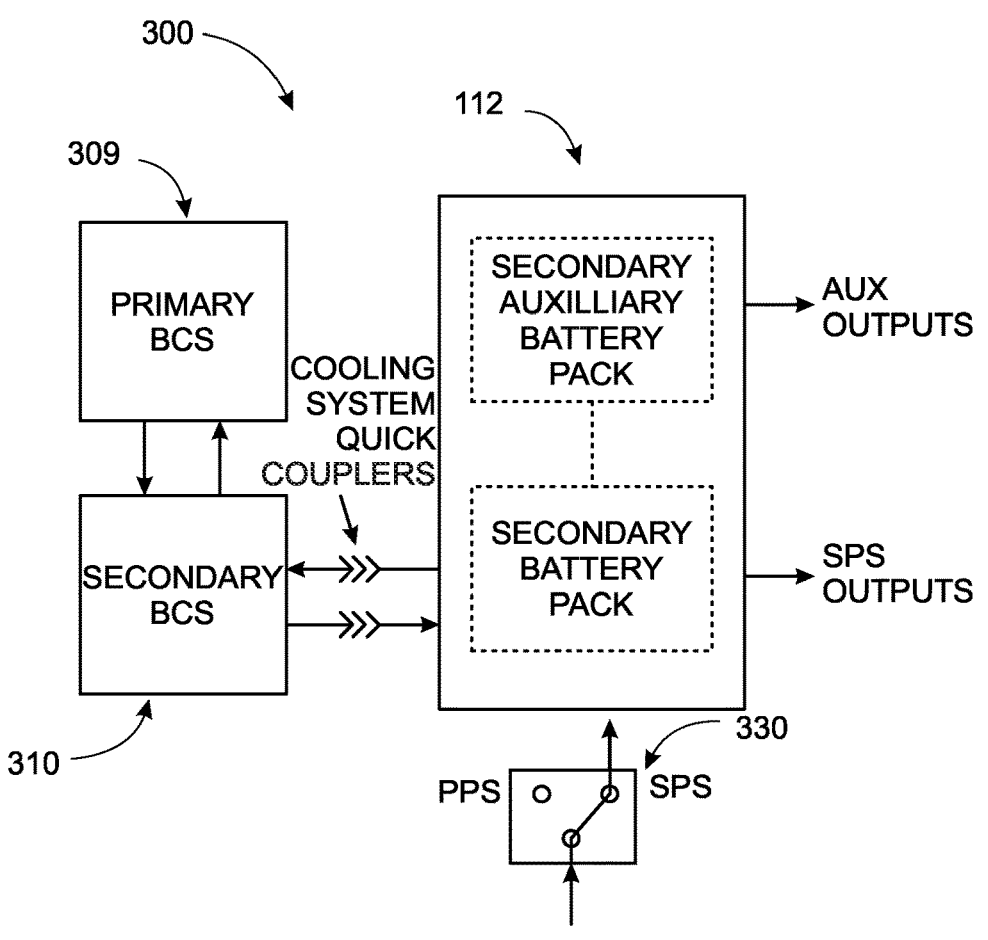
FIG. 13-13A are block diagrams illustrating examples of an electric vehicle with a secondary power system including a battery cooling system.

FIG. 13 illustrates an electric vehicle 300 having a secondary power system 112 with a secondary battery cooling system 310. In one example, the electric vehicle 300 includes a secondary battery cooling system 310 that is routed to a second location on the electric vehicle 300 independent of the electric vehicle primary battery cooling system 309. For example, the electric vehicle 300 may include a secondary power system 112 located at the rear or in the trunk area of the electric vehicle 300. The secondary cooling system 310 routes cooling fluid to the secondary power system 112.

In one example, the secondary battery cooling system 310 works with the primary battery cooling system 309 (e.g., similar to cooling system 124). Coolant is routed to the primary power system 110 having a primary battery pack 130 located at the bottom of the electric vehicle 300 (e.g., below the seats). Coolant is routed from the primary battery cooling system 309 to the secondary power system 112 via the secondary battery cooling system 310. In one example, coolant is routed through a top or bottom cooling distribution system 312 (e.g., via the vehicle frame and/or side panels) to a secondary power system 112 having a secondary battery pack 140 located at the rear (e.g. a trunk) of the vehicle 300.

As illustrated, the secondary cooling system 310 can be an extension of the primary cooling system or completely separate. In one example, the coolant is routed in polymeric or plastic tubing along the interior frame of the vehicle 300.

FIG. 13 further illustrates switch 330. Switch 330 allows a vehicle user to use a common vehicle charging port for independently charging the primary power system or the secondary power system. Switch 330 can be manually operated or can be operated via an electric vehicle GUI or a user device such as an application on a computer, tablet or phone.

Figure 13A:
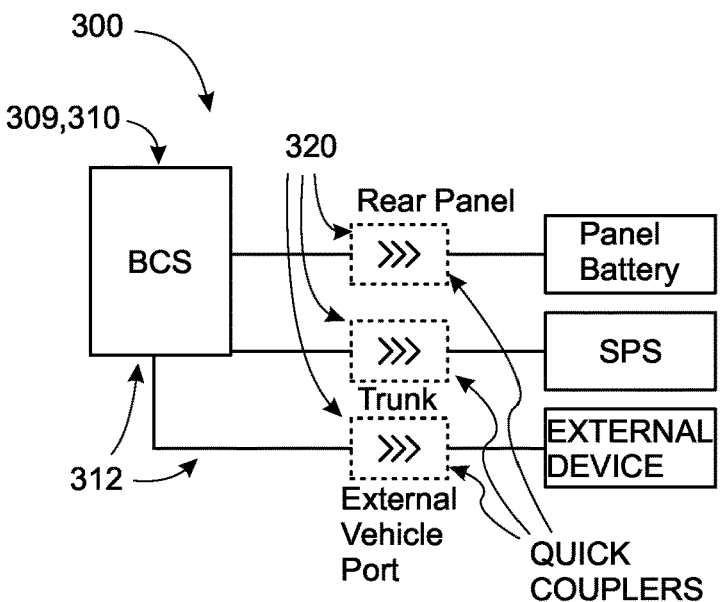

FIG. 13A is a diagram that illustrates one example where electric vehicle 300 includes a cooling distribution system 312 that includes a routing system for routing coolant to desired places and locations around the electric vehicle 300 (in addition to the primary power system). At various selected locations, a quick coupler or quick coupling device 320 is provided to couple external devices or the secondary power system 112 to the cooling distribution system 312 to provide coolant flow to those devices. The coolant flow may or may not be under pressure (e.g., constant pressure).

Electric Vehicle with Panel Battery System

In one example, the electric vehicle includes a panel battery system. The panel battery system allows a battery system (as part of a secondary power system or extension of the primary power system) to be located in other areas of the electric vehicle that may not be conventionally utilized as a battery location. For example, a panel battery system may be safely located in a crash zone of the electric vehicle such as electric vehicle 410.

Figure 14:
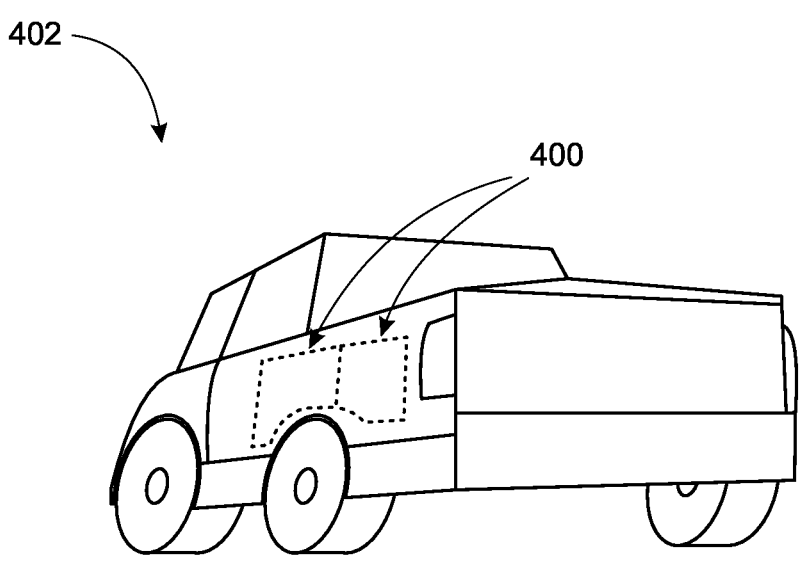
FIG. 14 is a diagram of an electric vehicle having a secondary power supply.

FIG. 14 illustrates one example of a panel battery system 400 in a location other than a typical battery location in an area under the seats of an electric vehicle 402. The battery system 400 can be part of a secondary power system or can be an extension of the primary power system. In one or more examples, the battery system 400 is located at or near an exterior panel of the electric vehicle. Due to the unique design of the battery system 400, the battery system may be located in or near a typical crash zone of the electric vehicle.

The battery system 400 is not limited to using a specific type of battery. In one example, the battery system 400 includes a battery pack having one or more lithium batteries. In another example, the battery system 400 includes a battery pack having one or more solid state batteries. In another example, battery system 400 includes a battery pack with another type of battery suitable for use in an electric vehicle.

One or more examples of a panel battery system 400 suitable for use in electric vehicle 402 are detailed in the following paragraphs.

Figure 15:
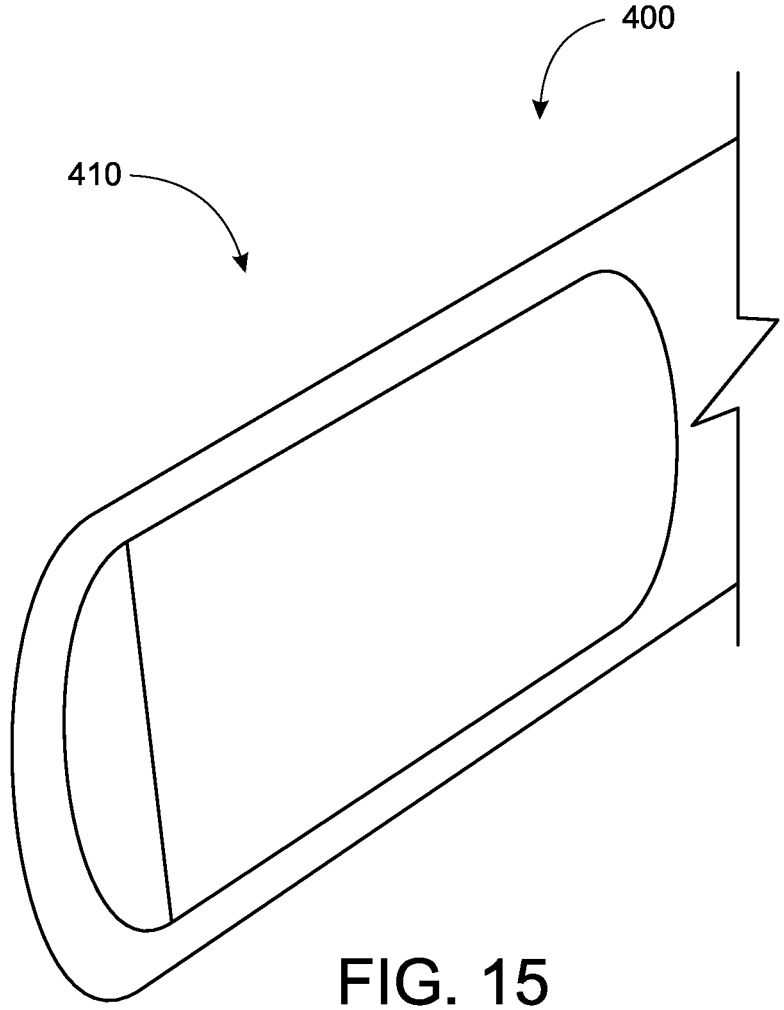
FIG. 15 is a diagram of a battery pack located near a vehicle exterior panel.

Form Fitting Battery. FIG. 15 illustrates one example of a battery system 400 suitable for use in an electric vehicle. The battery system 400 includes a form fitting battery 410 that is configured to flex or adapt to the shape of the available space where the battery is located. The form fitting battery 410 is located immediately adjacent to a vehicle exterior panel 412. In one example, the form fitting battery 410 is coupled or flexibly coupled to the exterior panel 412. The form fitting battery can be part of a battery pack or can be used as a single battery. In one example, the battery system 400 is an entirely flexible, shapeable battery. In another example, the battery system 400 includes an inner portion and an outer portion. The inner portion is relatively rigid compared to the outer portion. The outer portion is made of a flexible, shapeable material that adapts to the shape of the available battery space.

Figure 16:
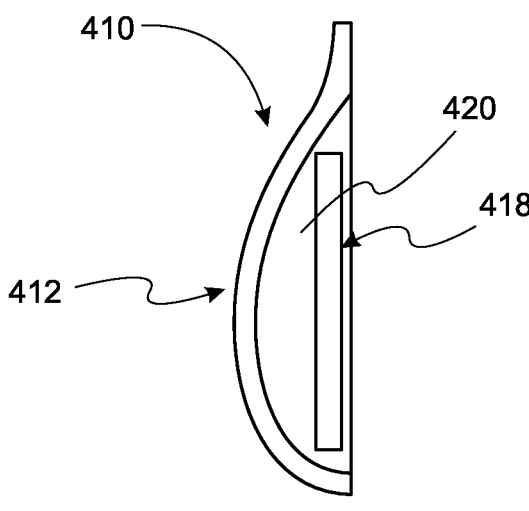
FIG. 16 is a diagram illustrating an interior view of the battery pack of FIG. 15.

FIG. 16 illustrates one example of form fitting battery 410. The battery system 400 includes an inner portion 418 and an outer portion 420. The outer portion 420 surrounds the inner portion 418. In one example, the outer portion 420 entirely surrounds the inner portion 418. In another example, the outer portion 420 partially surrounds the inner portion 418, such as only surrounding the major surfaces (e.g., for a rectangle shaped battery, the outer portion 420 surrounds the two major surfaces of the battery) of the inner portion 418. The inner portion 418 has a fixed shape, and an outer portion 420 that surrounds the inner portion 418 is shapeable and flexible to adapt to the shape or space of the where the battery is located. The form fitting battery can be a form fitting battery pack. In one example, the inner portion 418 is a lithium ion or solid state battery portion. Alternatively, the outer portion is an outer housing for the battery portion. The outer portion 420 can be coupled to panel section 412, thereby forming a panel battery that is a form fitting battery.

The form fitting battery 410 outer portion 420 can be made of one or more form fitting materials. In one example, the outer portion 420 is made of a moldable material or formable foam material. In another example, the outer portion 420 is made of a formable gel material that is capable of flexing with the available battery space. The outer portion 420 can also be made of multiple formable, flexible materials. In one example, the outer portion 420 includes multiple layers. In another example, the outer portion 420 is made of a material that molds to the shape of the available space, then hardens or semi-hardens to that shape. One example material for this embodiment is a shapeable mold material that cures over time.

Shaped panel battery. In another example, the electric vehicle includes a shaped battery. The shaped battery has a predefined shape suitable for a unique battery location for fitting within an electric vehicle. For example, the shaped battery may be located adjacent to an electric vehicle exterior panel or side panel, or may be located in a trunk or door space of a vehicle. Similar to the form-fitting battery, the shaped battery can include an inner portion that has a predefined shaped battery (e.g., a rectangle battery), and an outer portion having a predefined shape suitable for a unique space within the vehicle. As used herein, the term shaped battery includes a single battery, battery system, or battery pack.

Figure 17:
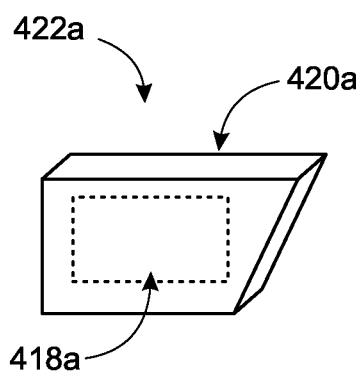
FIG. 17 is a diagram illustrating one example of a shaped battery pack used in an electric vehicle.
Figure 18:
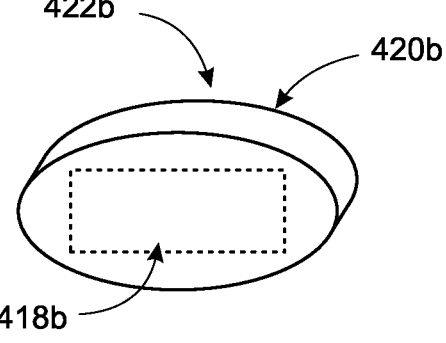
FIG. 18 is a diagram illustrating one example of a shaped battery pack used in an electric vehicle.
Figure 19:
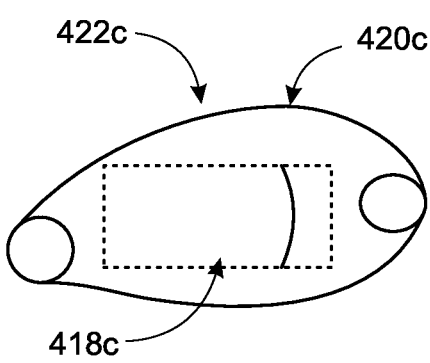
FIG. 19 is a diagram illustrating one example of a shaped battery pack used in an electric vehicle.
Figure 20:
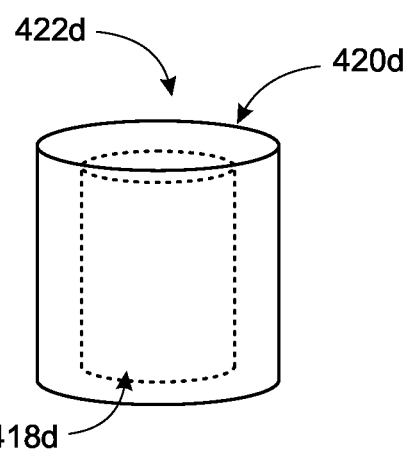
FIG. 20 is a diagram illustrating one example of a shaped battery pack used in an electric vehicle.
Figure 24:
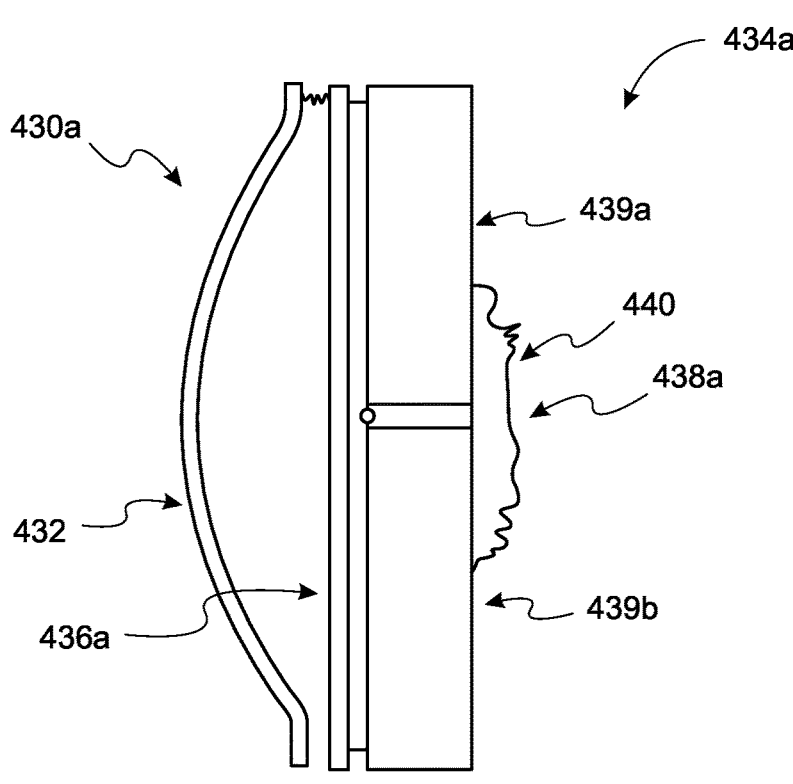
FIG. 24 is a diagram illustrating one example of a battery pack system used in an electric vehicle.
Figure 25:
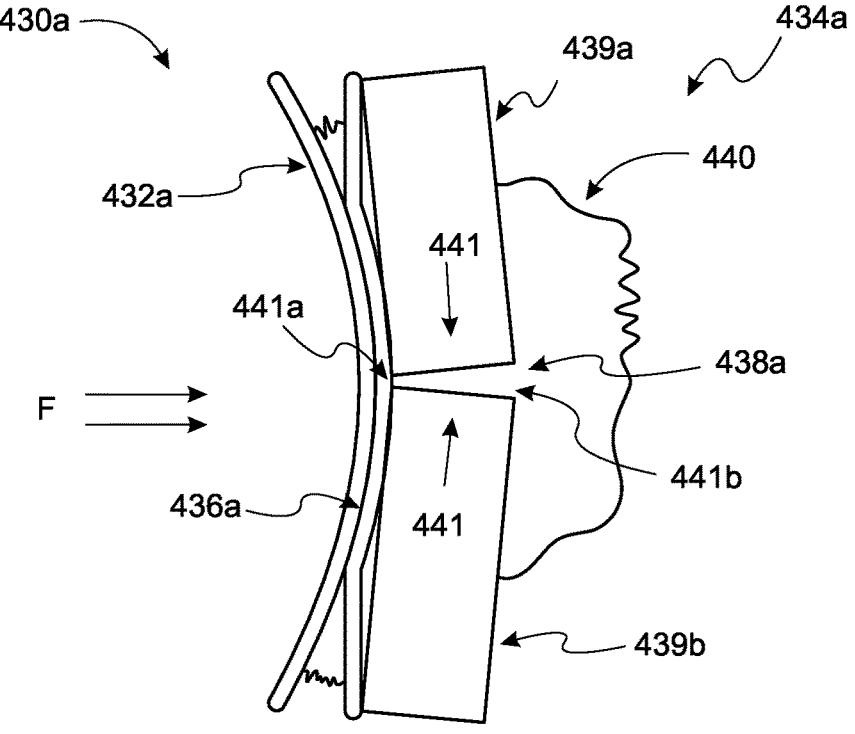
FIG. 25 is a diagram illustrating one example of a battery pack system used in an electric vehicle.

FIGS. 17-20 illustrate one or more examples of a shaped battery 422, indicated as 412a, 422b, 422c, and 422d, respectively. FIG. 17 illustrates a shaped battery having a geometric shape such as the shape of a trapezoid. The outer portion 420a is shaped as a trapezoid. The inner portion 418a is generally rectangular shaped. FIG. 18 illustrates a shaped battery having a geometric shape such as a circular shape. The outer portion 420b is generally circular or oval shaped. The inner portion 418b is generally rectangular shaped. FIG. 19 illustrates a shaped battery having a shape that is generally egg shaped or hive shaped. The outer portion 420c is generally egg shaped or hive shaped. The battery inner portion 418c is generally square or rectangular shaped. FIG. 20 illustrates a shaped battery having a cylindrical shape. The outer portion 420d is cylindrical shaped. The inner portion 418a is also cylindrical shaped (i.e., the outer portion is the same shape as the inner portion).

The batteries used herein can be made of many different materials suitable for use as an electric vehicle battery or part of an electric vehicle battery pack. For example, the batteries or battery packs can be box, rectangular, or cylindrical shaped. The batteries or battery packs can be lithium-ion based batteries, solid state batteries, or other battery types suitable for use in an electric vehicle.

Additional examples of a panel battery system 400 suitable for use in electric vehicle 402 are detailed in the following paragraphs. The electric vehicle 400 includes a structural or exterior panel battery pack. The panel battery pack includes an exterior panel of the electric vehicle operably coupled to the battery pack. In one example, the battery pack is a flexible battery pack. If the exterior panel receives a sudden impact force (e.g., due to a crash) resulting in a dent in the electric vehicle exterior panel, the flexible battery pack "flexes" inward with the dented panel. The flexed battery pack is fully functional due to the flexible design. One or more example exterior panel batteries are illustrated in this specification.

Electric Vehicle including Flexible Battery Pack with Barrier Layer. FIGS. 21-23 illustrate one example of a panel battery pack 430 as part of panel battery system 400 described herein. The panel battery pack 430 can include a barrier layer that operates as a "crash impact" layer and is a flexible puncture proof layer. In FIG. 21, the panel battery pack 430 includes an exterior panel 432, a battery pack 434, and a barrier layer 436. The barrier layer 436 is located between the exterior panel 432 and the battery pack 434. In one example, the battery pack 434 is a flexible battery pack. As illustrated in FIG. 22, upon receiving an impact force F (e.g., due to being located in a crash zone of the electric vehicle) at the exterior panel 432, the barrier layer 436 "flexes" with any damage done to the exterior panel without damage or minimizing damage to the flexible battery pack 434. If there is extensive damage to the exterior panel 432, the barrier layer 436 protects the flexible battery pack 434 from being punctured by the exterior panel 432.

In one example, the barrier layer 436 is moveable independent of the flexible battery pack 434. The battery pack 432 is flexibly coupled to the barrier layer 436, indicated by flexible connection 437. Further, the exterior panel 432 can be coupled (e.g., flexibly coupled) to the batteries located in the battery pack 432. Barrier layer 436 is made of a flexible, puncture proof material. In one example, the barrier layer 436 is made of Kevlar™ or similar material.

Electric Vehicle including a Panel Battery Pack with Flex Joint. FIG. 23 illustrates one example of a panel battery pack 430 including a battery pack 434 having a flex joint 438. The battery pack 434 can be flexible, and additionally includes the flex joint 438. The flex joint 438 is located at a predefined or desired location. In one example, the flex joint 438 is located between batteries 439a, 439b in the battery pack 434 or be located as part of a single battery. In one example, upon impact the flex joint "flexes" in response to the impact of the impact force F thereby reducing, minimizing or eliminating damaging force to the batteries located in the battery pack 432. Flex joint 438 is made of a flexible material, such as a flexible polymer, foam or rubber material.

FIGS. 24-27 illustrate another example of an electric vehicle including a panel battery pack with a flex joint. The panel battery pack 430a includes a flex joint 438a that opens up upon impact. In one example illustrated in FIGS. 24 and 25, the flex joint 438a is located in the crash zone of the exterior panel 432a (e.g., in a range of typical bumper height). As illustrated in FIGS. 26 and 27, upon impact, the flex joint 438a opens up allowing the impact to be absorbed by the flexible battery pack 434a at a predefined location by flexible movement of the 434a flexible battery pack. Even though the battery pack is structurally opened up, the battery pack 434a is still electrically coupled together. With this configuration, the battery pack 434a maintains electrical connection between individual batteries 439a, 439b located in the battery pack 434a via one or more electrical jumpers (e.g., electrical jumper 440 as illustrated). Although illustrated as maintaining the electrical connection within the battery pack and between batteries via one or more electric jumpers, electrical connection can be maintained using other flexible electrical connections (e.g., through a hinge joint).

In one example, the flex joint 438a is configured functionally with a hinge design, illustrated as hinge 441. Flex joint 438a maintains a mechanical connection at battery pack first major surface 441a via hinge 441. Flex joint 438a can also maintain an electrical connection between batteries and within the battery pack at the hinge joint 441. The hinge joint 441 flexes with impact, and hinges open at battery pack second major surface 441b.

Electric Vehicle including a Panel Battery Pack with Sheer Joint. FIG. 28 illustrates one example of an electric vehicle including a panel battery pack with a sheer joint. Upon impact by an external force (such as an electric vehicle collision) the sheer joint allows the battery pack to break into separate batteries at a predefined location (i.e., the sheer joint) while maintaining the operational and electrical integrity of the battery.

In one example illustrated, the panel battery pack 430 includes a battery pack 434b (e.g., a flexible battery pack) having a sheer joint 442. The battery pack 434b includes the first battery 439a and the second battery 439b. The first battery 439a is mechanically coupled to the second battery 439b at sheer joint 442. First battery 439a and second battery 439b are both electrically coupled to battery pack 434b, and may be electrically coupled to each other as represented by electrical couple (e.g., electrical jumper) 440. Upon impact (illustrated by force F), the sheer joint 442 allows the flexible battery pack 434b to separate into separate batteries 439a, 439b at a predefined location in response to the impact force without doing damage to the operational integrity of the panel battery pack 430. Although the structural/mechanical connection is separated at sheer joint 442, the electrical connection to the battery pack 434a or between batteries 439a, 439b is maintained via electrical connection 440.

Alternatively, the sheer joint is located in a single battery. The sheer joint operates to break the battery into two parts at a predefined location, thereby preserving the operational integrity of the battery. Sheer joint 442 can be configured in a number of ways. In one example, it is a weaker polymeric region located between batteries on a battery pack. In another example, it comprises a material that immediately separates upon impact such as a foam or gel material.

Electric Vehicle including a Panel Battery Pack with an expansion layer. FIG. 29 illustrates one example of an electric vehicle including a battery pack having an expansion layer. The expansion layer operates to mitigate a leak (e.g., a coolant or battery material leak) in case of an impact to the battery pack.

In one example, battery pack 434c includes sheer joint 442a. Battery pack 434c is similar to the battery packs previously described herein and can be part of a panel battery system. Sheer joint 442a includes an expansion layer or expansion material 443. In one example, expansion layer 443 is located in sheer joint 442a. Expansion layer 443 includes an expansion material. The expansion material is an active material. In operation, the expansion material is activated when exposed to a defined condition, such as separation of the sheer joint, overheating, or exposure to one or more elements such as air or a liquid. When activated, the expansion material expands into the space surrounding the sheer joint 442 and battery pack 434b. Once expanded, the expansion material is operable to mitigate a predetermined condition. For example, the expansion material can operate to seal off or absorb a liquid leak from the battery pack. The expansion material can operate to seal off, separate, or mitigate any damage caused to the battery or possible fire due to the impact. The expansion material can operate to provide a fire retardant or chemical fire retardant to the battery pack.

In one example, the battery pack 434b receives a side force due to a vehicle crash. The force F causes an impact to the battery pack 434b and causes the battery pack to separate at the sheer joint 442. Upon impact, the sheer joint 442 will separate. Upon separation of the sheer joint 442, the expansion material 443 is activated. In one example, upon occurrence of a predetermined event (e.g., separation of the sheer joint, overheating, etc.), the expansion material will be activated. In one example, the expansion material 443 expands and absorbs any liquid leaks upon separation of the sheer joint. Additionally, the expansion material can operate to mitigate or stop the leak or mitigate or stop any possible damage due to a fire. The electrical integrity of the battery pack is maintained.

In one example, the expansion material 443 is a safety filler. The flexible battery 434b may include a safety filler system. The safety filler system may be a foam filler. Upon impact, the safety filler is activated to fill gaps and regions of the panel battery 430. The foam can be expansion foam. The foam solidifies with time, allowing the impacted battery to be maintained within the crash region. Additionally, if there is damage to the battery such as release of battery materials or coolant, the fluids are retained or release of fluid minimized by the activated foam filler. If the foam filler is accidentally released, there would be no damage to the panel battery.

Panel Battery with Battery in a Bag System. FIGS. 30, 31A and 31B illustrate one example of an electric vehicle including a battery in a bag system. The battery pack or single battery is located in a flexible, puncture proof bag to contain any leaks (e.g., a coolant leak) as a result of an accident or battery failure. In one example illustrated in FIG. 30, the entire battery pack 434d is located in a bag 435. If a barrier layer 436 is present, it can be outside of the bag 435 (as illustrated) or inside the bag 435. In another example illustrated in FIG. 31A, the battery pack 430 is not entirely located inside the bag 435. The bag system 435 can include a first bag protection layer 435a attached to one side of the battery pack 434d, and a second bag protection layer 435b attached to another side of the battery pack 434d. In another example illustrated in FIG. 31B, a bag protection layer is only located on one side of the battery pack 434d. This type of configuration is useful to mitigate coolant leaks on sides of the battery pack where they are more likely to occur. For example, in a battery pack that includes a flex joint that may be a hinged flex joint, or a battery pack having a sheer joint, the bag protection layer can be located on a side of the battery pack facing away from the exterior of the electric vehicle or on a side facing the exterior of the electric vehicle, as desired.

In one example, the bag material is made of a thin film bag material. In one example, the bag material is made of a puncture proof polymeric material. In one example, the bag material is a thin foil bag material.

Truck with Electric Tailgate Including Panel Battery System

Figure 32:
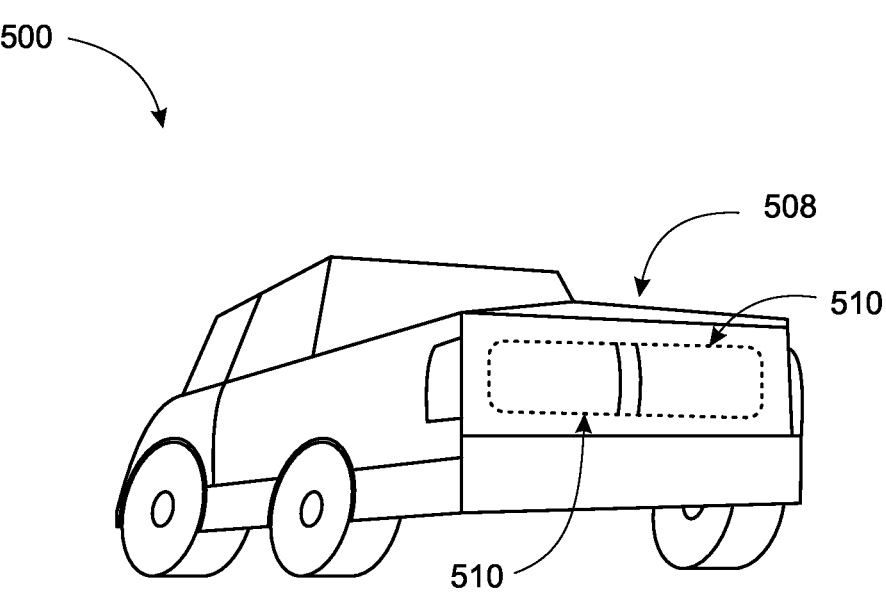
FIG. 32 is a diagram illustrating one example of an electric vehicle having an electric tailgate.

FIG. 32 illustrates one example of a truck 500 including an electric tailgate 508 having a tailgate power system 510. The tailgate power system 510 is a secondary power system located in the electric tailgate. In one example, the tailgate secondary power system 510 is similar to one or more of the secondary power systems previously described herein. The tailgate power system 510 can be used to power electric vehicle auxiliary devices or external devices. The tailgate power system 510 can also be used as a backup/emergency power source for the electric truck 500.

In one example, the tailgate power system 510 is entirely located in the tailgate of the electric truck. In another example, the tailgate power system 510 is partially located in the tailgate of the electric truck. In one example, the tailgate power system 510 only includes a battery pack that can be used as part of a secondary power system or as an extension or backup to the electric truck primary power system.

Figure 33:
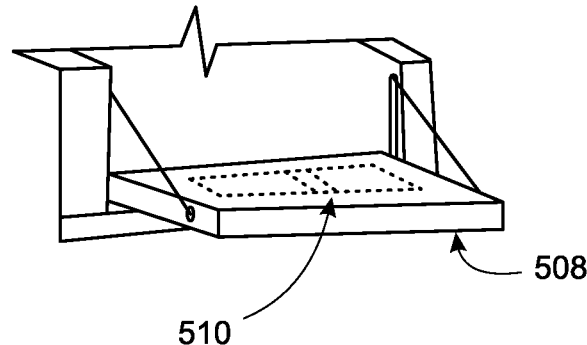
FIG. 33 is a diagram illustrating one example of an electric vehicle having an electric tailgate.

FIG. 33 illustrates an electric tailgate 508 in an open position. In one example, the tailgate power system 510 is independent of the vehicle power system. The tailgate power system can be used with an electric truck or a conventional truck. The electric tailgate 508 having a tailgate electric power system 510 can be retrofit for use with existing electric trucks, or only used when an additional power system is needed. When used with an electric truck, the tailgate 508 having a tailgate electric power system 510 can simply be switched out with the conventional tailgate. If necessary, the electric tailgate can be electrically coupled to the electric vehicle through a quick connect device. In a similar manner, the tailgate power system can be quick connected to the electric truck battery cooling system or other electric truck systems.

Figure 34:
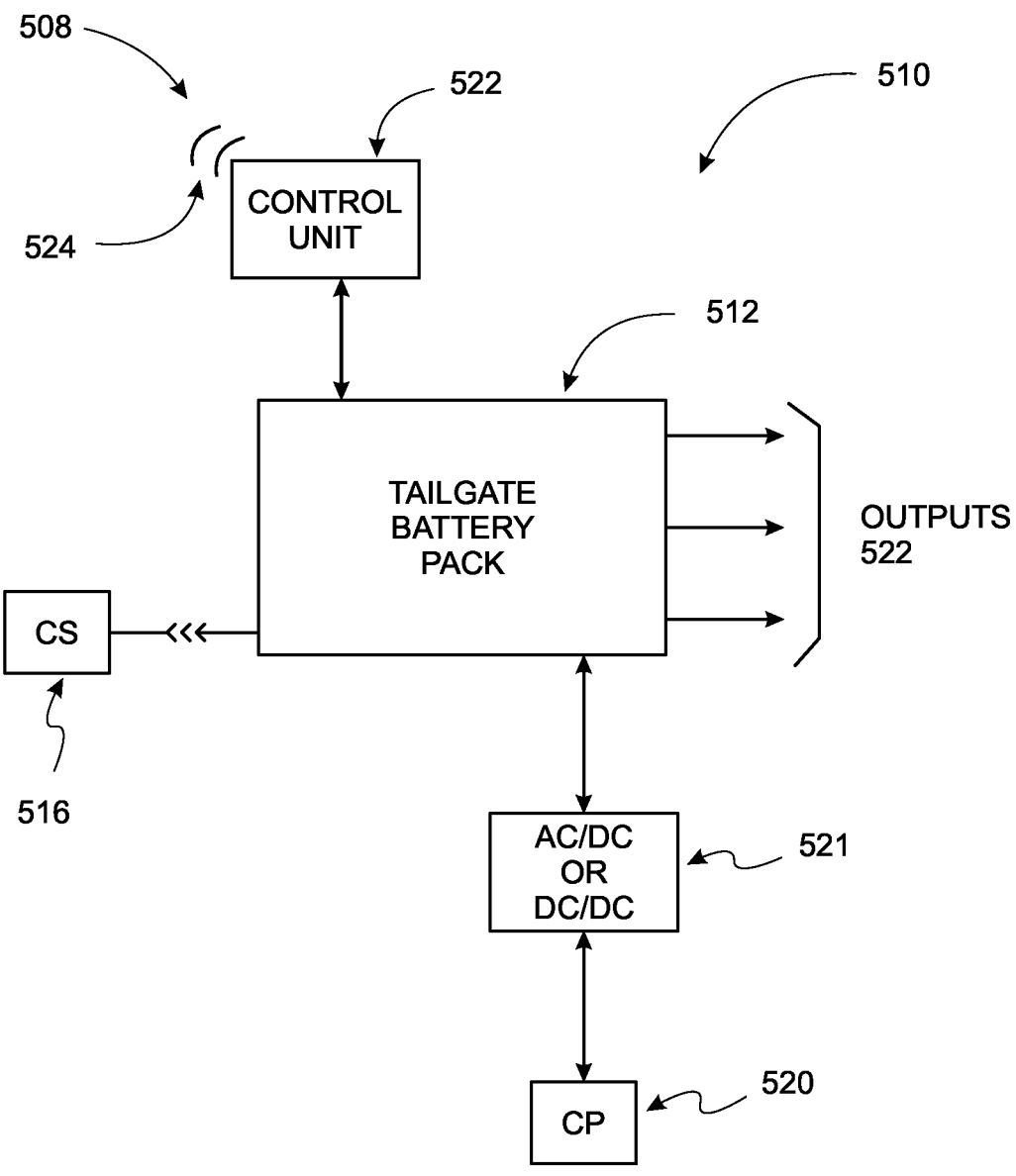
FIG. 34 is a block diagram illustrating one example of an electric tailgate.

FIG. 34 is a block diagram illustrating one example of the electric tailgate 508 having a tailgate power system 510. The electric tailgate 508 includes the tailgate power system 510. The tailgate power system is a secondary power system similar to those previously described herein.

The tailgate power system 510 can include one or more of the following features located in a vehicle electric tailgate 508: a tailgate (secondary) battery pack 512 including a secondary battery pack and may also include a secondary auxiliary battery; an AC/DC and/or DC/DC power converter; a battery pack cooling system and/or a mechanism for coupling to the vehicle primary power system battery cooling system 516; a power port 520, (e.g., a bi-directional power port); and/or a number of external power outputs 522 (electric vehicle outputs or external power outputs/outlets). In one example, one or more of the power ports provides for magnetic coupling of devices to the tailgate secondary power system.

In one example, the tailgate battery pack 512 includes one or more batteries suitable for use in an electric vehicle. In one example, the tailgate battery pack 512 is made up of one or more solid state batteries. In another example, the tailgate battery pack 512 is made up of one or more lithium ion batteries.

The tailgate secondary power system can include its own tailgate control unit 522 and/or can be coupled to the primary vehicle control unit. In one example, the tailgate secondary power system control unit wirelessly couples (e.g., via bluetooth) to the primary vehicle control unit, or a user interface, indicated at 524.

Figure 35:
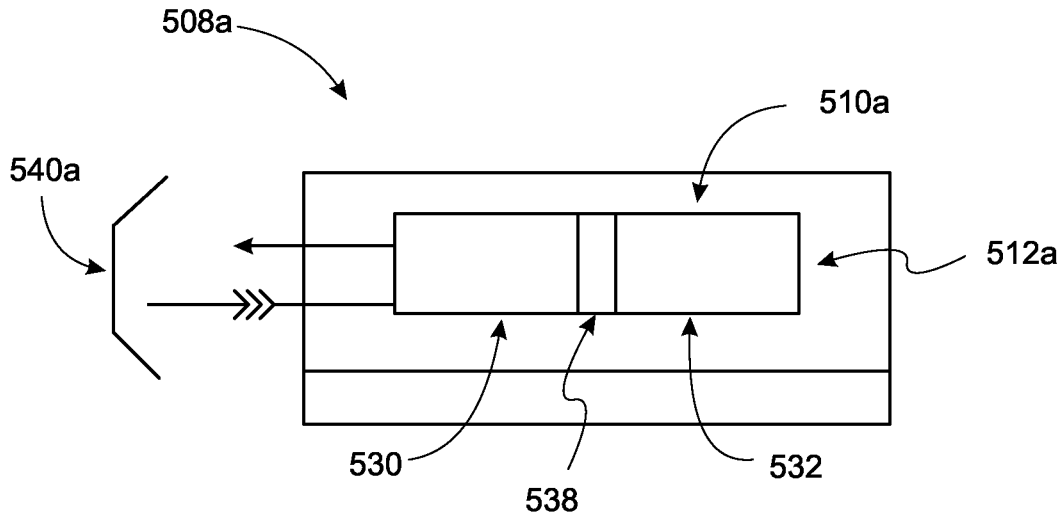
FIG. 35 is a diagram illustrating one example of an electric tailgate.

FIG. 35 illustrates one example of an electric tailgate at 508a. The electric tailgate 508a includes tailgate power system 510a including tailgate battery pack 512a. The tailgate battery pack 512a can be similar to the panel battery packs previously detailed herein. The tailgate battery pack 512a includes a first battery 530 and a second battery 532. The first battery 530 and the second battery 532 are coupled together at flex joint 538 similar to flex joints previously described herein. In one example, the flex joint 538 is a hinge flex joint or sheer joint. In one example, the battery pack 512*a* is a panel battery pack as described herein. Outputs 540 can be quick coupled to the electric vehicle, other electric power systems or auxiliary systems or devices.

Figure 36:
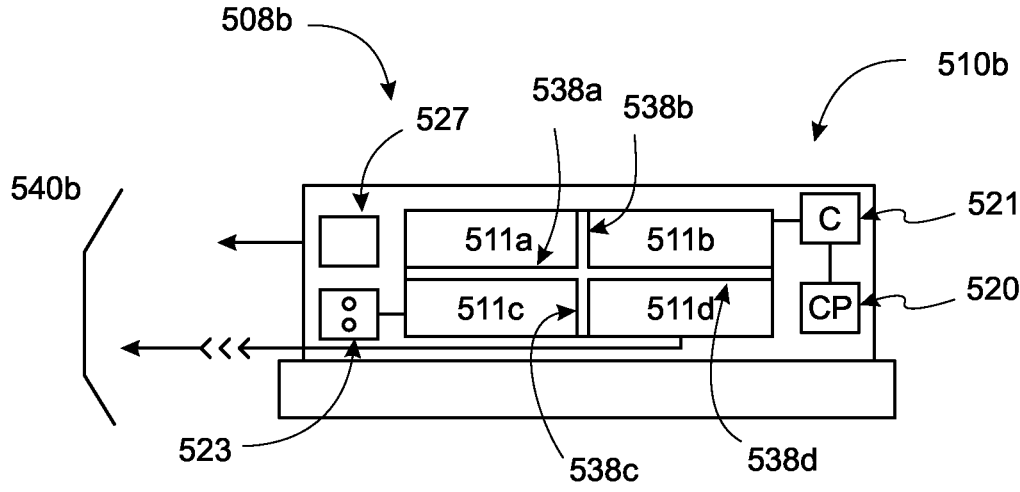
FIG. 36 is a diagram illustrating one example of an electric tailgate.

FIG. 36 illustrates one example of an electric tailgate, indicated as electric tailgate 508*b*. The electric tailgate 508*b* includes a tailgate power system 510*b* having a tailgate battery pack 512*b*. The tailgate battery pack 512*b* is a panel battery pack and includes flex joints 538*a,b,d* & *d*. The tailgate power system 510*b* further includes converter 530, tailgate control unit 532, and charging port 520 (e.g., as illustrated in FIG. 34). In one example, charging port 520 is a bi-directional charging port.

Figure 37:
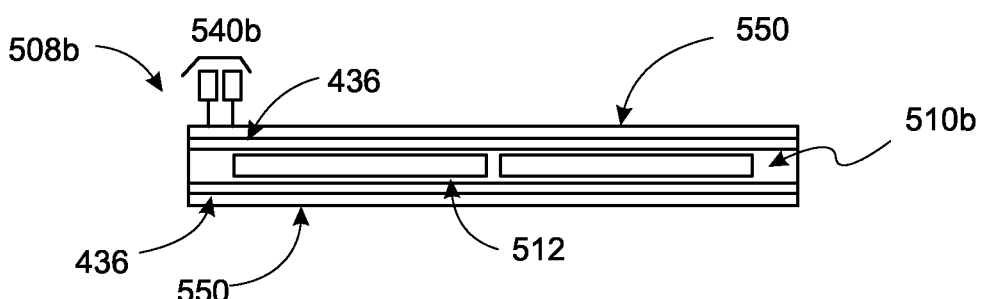
FIG. 37 is a block diagram illustrating one example of an electric vehicle having a secondary power system located in the tailgate of the vehicle.

FIG. 37 is a top view that illustrates one example of tailgate power system 510*b* including battery pack 512 positioned within electric tailgate 508*b*. The electric tailgate 508*b* includes a housing 550 having exterior panel 552 and box panel 554. The battery pack 512 is configured as a panel battery pack as previously described herein, and includes one or barrier layers 436.

In one example the tailgate is a truck tailgate. In other examples, the tailgate is a car tailgate or hatchback door.

The tailgate having a secondary power system could be easily retrofitted with existing electric trucks or more traditional combustion engine vehicles. In one example, the tailgate includes a panel battery. The panel battery may be a flexible panel battery that is located above a crash zone of the tailgate. The tailgate battery may be used as a primary battery system, a secondary battery system, or a back-up/emergency battery system. The tailgate secondary power supply system could be separate or plugged into the vehicle coolant system. May be connected to the truck cooling system using a quick connect or quick coupling technology.

The battery could be charged in a number of ways, including using a separate plug-in or solar system. May include additional functional outlets to power external devices. The external devices could be AC (120 v or 240 v) or DC devices.

EV with Trunk or Hatchback Charging System. The trunk or hatchback charging system may be used to charge a secondary power system or as a second system for charging a primary power system. The trunk charging system may include one or more 220 volt or 120 volt plug. Alternatively, the trunk charging system may be integrated into an external panel of the trunk. The trunk may be used as an add-on or retrofit charging system to an existing EV. In one example, the trunk includes a charging port separate from the vehicle charging port. The trunk/hatchback may also include a solar panel for charging the secondary power system battery.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The following claims are part of the specification.

The invention claimed is:

1. An electric vehicle comprising:
a primary power system, the primary power system including a primary battery pack and an auxiliary battery, where the auxiliary battery pack is at a voltage different than the primary battery pack;
a vehicle control unit in communication with the primary power system, where the vehicle control unit controls operation of the primary power system;
an electric tailgate having a tailgate power system located therein, the tailgate power system including a secondary power system having a secondary battery pack, where the secondary power system is located in a vehicle location different form the primary power system, adjacent to an exterior panel of the electric tailgate, and a comprises a panel battery.

2. The electric vehicle of claim 1, where the panel battery is a form fitting battery comprising an outer portion and an inner portion, where the inner portion comprises a fixed shape and the outer portion comprises a flexible shape and is made of a shapeable material that adapts to the shape of a space in the electric tailgate where the battery is located.

3. The electric vehicle of claim 2, where the panel battery is flexibly coupled to the exterior panel.

4. The electric vehicle of claim 2, where the inner portion comprises a battery or battery pack, and where the outer portion completely surrounds the inner portion.

5. The electric vehicle of claim 2, where the panel battery is a shaped flexible battery having a predefined shape that is defined by a shape of the outer portion.

6. The electric vehicle of claim 2, the tailgate power system comprising the secondary battery pack, a DC/DC converter, and a secondary auxiliary battery having a voltage different than the secondary battery pack.

7. The electric vehicle of claim 6, comprising:
a tailgate cooling system coupled to the tailgate power system; and
a mechanism for coupling the tailgate cooling system to a primary power system battery cooling system of the electric vehicle.

8. The electric vehicle of claim 7, comprising:
a power port configured to charge the tailgate power system; and
one or more external power outlets coupled to the secondary auxiliary battery.

9. An electric vehicle comprising:
a primary power system, the primary power system including a primary battery pack and an auxiliary battery, where the auxiliary battery pack is at a voltage different than the primary battery pack;
a vehicle control unit in communication with the primary power system, where the vehicle control unit controls operation of the primary power system;
an electric tailgate having a tailgate power system located therein, the tailgate power system including a secondary power system including a secondary battery pack, where the secondary power system is located in a vehicle location different from the primary power system, adjacent to an exterior panel of the electric tailgate, and comprises a panel battery that is a flexible battery pack, where upon impact due to an external force the flexible battery pack operates to flex in a predefined manner to mitigate damage to the secondary power system due to the external force.

10. The electric vehicle of claim 9, comprising:
a barrier layer flexibly coupled to the flexible battery pack, where the barrier layer is positioned between the exterior panel and the flexible battery pack, where the barrier layer is made of a flexible, puncture proof material.

11. The electric vehicle of claim 10, where the barrier layer is movably coupled to the flexible battery pack, and is moveable relative to the flexible battery pack.

12. The electric vehicle of claim 9, comprising where the flexible battery pack comprises a flex joint that allows the flexible battery pack to flex at a predefined location upon impact, minimizing damage to batteries located in the flexible battery pack.

13. The electric vehicle of claim 12, where flexible battery pack includes a first battery and a second battery, the flex joint being located between the first battery and the second battery, and where the flex joint is at a predefined location within a crash zone of the electric tailgate that causes the battery pack to open up at the predefined location at the flex joint upon impact from an external force.

14. The electric vehicle of claim 12, whereupon impact the flex joint causes the flexible battery pack to structurally open up at a predefined location, while maintaining the electrical integrity of the battery pack.

15. The electric vehicle of claim 14, the flexible battery pack comprising a first battery, a second battery, and the flex joint located between the first battery and the second battery; and an electrical connection between the first battery and the second battery separate from the flex joint, where the electrical connection comprises an electrical jumper.

16. The electrical vehicle of claim 12, where the flex joint is a hinged flex joint.

17. The electric vehicle of claim 12, where the flex joint is a sheer joint.

18. The electric vehicle of claim 12, comprising:
a barrier layer flexibly coupled to the flexible battery pack, where the barrier layer is positioned between the exterior panel and the flexible battery pack.

19. The electric vehicle of claim 12, comprising:
where the flex joint comprises an expansion layer made of an expansion material that operates to mitigate a leak upon impact of an external force to the battery pack.

20. The electric vehicle of claim 12, comprising:
one or more tailgate outlets electrically coupled to the secondary battery pack.

\* \* \* \* \*